United States Patent
Aluthge et al.

(10) Patent No.: US 9,969,828 B2
(45) Date of Patent: May 15, 2018

(54) CO-SUPPORTED CATALYSTS FOR THE TANDEM TRIMERIZATION AND POLYMERIZATION OF ETHYLENE TO PRODUCE LINEAR LOW DENSITY POLYETHYLENE

(71) Applicants: California Institute of Technology, Pasadena, CA (US); King Fahd University of Petroleum and Minerals, Dhahran (SA)

(72) Inventors: Dinesh C. Aluthge, Pasadena, CA (US); Aaron Sattler, Hoboken, NJ (US); Mamdouh Al-Harthi, Dhahran (SA); Jay A. Labinger, Claremont, CA (US); John E. Bercaw, Pasadena, CA (US)

(73) Assignees: California Institute of Technology, Pasadena, CA (US); King Fahd University of Petroleum and Minerals, Dhahran (SA)

( * ) Notice: Subject to any disclaimer, the term of this patent is extended or adjusted under 35 U.S.C. 154(b) by 0 days. days.

(21) Appl. No.: 15/411,583

(22) Filed: Jan. 20, 2017

(65) Prior Publication Data

US 2017/0210834 A1  Jul. 27, 2017

Related U.S. Application Data

(60) Provisional application No. 62/281,281, filed on Jan. 21, 2016.

(51) Int. Cl.
C08F 4/76 (2006.01)
C08F 4/64 (2006.01)
(Continued)

(52) U.S. Cl.
CPC ........ *C08F 210/16* (2013.01); *C08F 4/64124* (2013.01); *C08F 110/02* (2013.01);
(Continued)

(58) Field of Classification Search
CPC ........................ C08F 4/60124; C08F 4/64124; C08F 110/02; C08F 2420/02; C08F 2500/08
See application file for complete search history.

(56) References Cited

U.S. PATENT DOCUMENTS

| 6,620,896 B1 | 9/2003 | Killian et al. |
| 2011/0082325 A1* | 4/2011 | Suzuki .................. B01J 31/143 585/511 |

FOREIGN PATENT DOCUMENTS

| EP | 0416815 A2 | 3/1919 |
| WO | 2017127705 A1 | 7/2017 |

OTHER PUBLICATIONS

Karbach, F.F.; Severn, J.R.; Duchateau, R. ACS Catal. 2015, 5, 5068-5076.*
(Continued)

*Primary Examiner* — Rip A Lee
(74) *Attorney, Agent, or Firm* — Nixon Peabody LLP

(57) ABSTRACT

Linear low density polyethylene (LLDPE) is produced from an ethylene-only feed over a tandem catalyst system consisting of a phenoxy-imine titanium trimerization catalyst and a silylene-linked cyclopentadienyl/amido titanium polymerization catalyst co-supported on the same methylaluminoxane/silica particles. The level of 1-hexene incorporation in the LLDPE can be controlled by varying the ethylene pressure. Tandem, co-silica-supported ethylene trimerization and ethylene/1-hexene copolymerization catalysts produce linear low density polyethylene (LLDPE) from an ethylene-only feedstock. The percentage 1-hexene incor-
(Continued)

20 Claims, 5 Drawing Sheets

(51) Int. Cl.
- C08F 110/02 (2006.01)
- C08F 210/16 (2006.01)
- C08F 4/60 (2006.01)

(52) U.S. Cl.
CPC ...... C08F 4/60124 (2013.01); C08F 2420/02 (2013.01); C08F 2500/08 (2013.01)

(56) References Cited

OTHER PUBLICATIONS

Sattler, A.; Aluthge, D.C.; Winkler, J.R.; Labinger, J.A.; Bercaw, J.E. ACS Catal. 2016, 6, 19-22.*
Suzuki, Y,; Kinoshita, S.; Shibahara, A.; Ishii, S.; Kawamura, K.; Inoue, Y.; Fujita, T. Organometallics 2010, 29, 2394-2396.*
Aluthge et al., Cosupported Tandem Catalysts for Production of Linear Low-Density Polyethylene from an Ethylene-Only Feed, ACS Catalysis, 2016, vol. 6(10), pp. 6581-6584.
Aluthge et al., Cosupported Tandem Catalysts for Production of Linear Low-Density Polyethylene from an Ethylene-Only Feed, ACS Catalysis, 2016, vol. 6(10), pp. 6581-6584. Supporting Information pp. 1-7.
Klosin et al., Development of Group IV Molecular Catalysts for High Temperature Ethylene-α-Olefin Copolymeization Reactions, Accounts of Chemical Research, 2015, vol. 48(7), pp. 2004-2016.
Hlatky G., Heterogeneous Single-Site Catalysts for Olefin Polymerization, Chemical Reviews, 2000, vol. 100(4), pp. 1347-1376.
Lohr et al., Orthogonal Tandem Catalysis, Nature Chemistry, 2015, vol. 7, pp. 477-482.
Suzuki et al., Trimerization of Ethylene to 1-Hexene with Titanium Complexes Bearing Phenoxy-Imine Ligands with Pendant Donors Combined with MAO, Organometallics, 2010, vol. 29(11), pp. 2394-2396.
Suzuki et al., Trimerization of Ethylene to 1-Hexene with Titanium Complexes Bearing Phenoxy-Imine Ligands with Pendant Donors Combined with MAO, Organometallics, 2010, vol. 29(11), pp. 2394-2396. Supporting Information pp. 1-14.
Sattler et al., Enhanced Productivity of a Supported Olefin Trimerization Catalyst, ACS Catalysis, 2016, vol. 6(1), pp. 19-22.
Okuda J., Functionalized cyclopentadientyl ligands, IV. Synthesis and complexation of linked cyclopentadienyl-amido ligands, Chemische Berichte, 1990, vol. 123(8), pp. 1649-1651.
Mehdiabadi et al., Ethylene Homopolymerization Kinetics with a Constrained Geometry Catalyst in a Solution Reactor, Macromolecules, 2012, vol. 45(4), pp. 1777-1791.
Mehdiabadi et al., Ethylene Homopolymerization Kinetics with a Constrained Geometry Catalyst in a Solution Reactor, Macromolecules, 2012, vol. 45(4), pp. 1777-1791. Supporting Information pp. 1-3.
Liu et al., Synthesis, Characterization, and Heterobimetallic Cooperation in a Titanium-Chromium Catalyst for Highly Branched Polyethylenes, Journal of the American Chemical Society, 2013, vol. 135(24), pp. 8830-8833.
Liu et al., Synthesis, Characterization, and Heterobimetallic Cooperation in a Titanium-Chromium Catalyst for Highly Branched Polyethylenes, Journal of the American Chemical Society, 2013, vol. 135(24), pp. 8830-8831 Supporting Information.
Fink et al., Propene Polymerization with Silica-Supported Metallocene/MAO Catalysts, Chemical Reviews, 2000, vol. 100(4), pp. 1377-1390.
Komon et al., Triple Tandem Catalyst Mixtures for the Synthesis of Polyethylenes with Varying Structures, Journal of the American Chemical Society, 2002, vol. 124(51), pp. 15280-15285.
Quijada et al., Synthesis of Branched Polyethylene from Ethylene by Tandem Action of Iron and Zirconium Single Site Catalysts, Macromolecules, 2001, vol. 34(8), pp. 2411-2417.
Ye et al., A Tandem Catalytic System for the Synthesis of Ethylene-Hex-1-ene Copolymers from Ethylene Stock, Macromolecular Rapid Communications, 2004, vol. 25, pp. 647-652.
Zhang et al., Effect of Catalysts Supporting on Tandem Polymerization of Ethylene Stock in Synthesis of Ethylene-1-Hexene Copolymer, Industrial & Engineering Chemistry Research, 2008, vol. 47(15), pp. 5369-5375.
Bercaw et al., Ethylene and Alpha Olefin Trimerization and Tandem Trimerization /Polymerization of Ethylene, American Chemical Society National Meeting, San Diego, CA, Mar. 13, 2016.
Sattler et al., Lewis Acid Promoted Titanium Alkylidene Formation: Off-Cycle Intermediates Relevant to Olefin Trimerization Catalysts, Journal of the American Chemical Society, 2014, vol. 136(30), pp. 10790-18000.
Sattler et al., Lewis Acid Promoted Titanium Alkylidene Formation: Off-Cycle Intermediates Relevant to Olefin Trimerization Catalysts, Journal of the American Chemical Society, 2014, vol. 136(30), pp. 10790-18000. Supporting Information 1-7.
Sattler et al., Highly Selective Olefin Trimerization Catalysis by a Borane-Activatd Titanium Trimethyl Complex, Organometallics, 2013, vol. 32(23), pp. 6899-6902.
Sattler et al., Highly Selective Olefin Trimerization Catalysis by a Borane-Activatd Titanium Trimethyl Complex, Organometallics, 2013, vol. 32(23), pp. 6899-6902. Supporting Information 1-28.
Karbach et al., Effect of Aluminum Alkyls on a Homogeneous and Silica-Supported Phenoxy-Imine Titanium catalyst for Ethylene Trimerization, ACS Catalysis, 2015, vol. 5(9), pp. 5068-5076.
Zhang et al., Synthesis of ethylene-1-hexene copolymers from ethylene stock by tandem action of bis(2-dodecylsulfanyl-ethyl) amine-CrCl3 and Et(Ind)2ZrCl2, Jornal of Polymer Science: Part A, 2007, vol. 45(16), pp. 3562-3569.
Musikabhumma et al., Synthesis of Branched Polyethylenes by the Tandem Catalysis of Silica-Supported Linked Cyclopentadienyl Amido Titanium Catalysts and a Homogeneous Dibromo Nickel Catalyst Having a Pyridylimine Ligand, Journal of Polymer Science: Part A, Polymer Chemistry, 2003, vol. 41, pp. 528-544.
International Search Report and Written Opinion for PCT/US2017/014373 dated May 1, 2017, 14 pages.

* cited by examiner

CO-SUPPORTED CATALYSTS FOR THE TANDEM TRIMERIZATION AND POLYMERIZATION OF ETHYLENE TO PRODUCE LINEAR LOW DENSITY POLYETHYLENE

CROSS-REFERENCE TO RELATED APPLICATION

This application claims the benefit under 35 U.S.C. § 119(e) of U.S. Provisional Patent Application No. 62/281,281 filed on Jan. 21, 2016, which is incorporated herein by reference in its entirety.

FIELD OF THE INVENTION

In various embodiments the present invention relates to supported catalysts for the polymerization of ethylene and the copolymerization of ethylene with 1-hexene.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

Copolymerization of ethylene with α-olefins such as 1-hexene to generate linear low density polyethylene (LLDPE) is a widely used industrial process. The current industrial process involves the oligomerization of ethylene to generate α-olefins using an oligomerization catalyst, separation of 1-hexene or 1-octene from the oligomeric product mix, and subsequent copolymerization of the α-olefin with ethylene in a separate reactor using a different catalytic system to generate LLDPE.

Orthogonal tandem catalysis, where two independent catalysts operate together to perform consecutive transformations in a single reactor, would make this process more efficient and economical (FIG. 1). In order to devise an industrially relevant catalyst system we have developed a tandem version whereby both catalysts are co-supported on the same silica particles. By carrying out ethylene polymerizations with the catalyst in this form, the particle morphology of the polyethylene product is found to be highly uniform and free flowing without undesired "fines" (very small, dusty polyethylene components). Supported catalysts are widely used industrially in polyolefin synthesis due to ease of product isolation and to prevent clogging of industrial reactors from powdery, free moving polymer particles. While supported systems for a tandem route to LLDPE are known, in these cases the trimerization catalyst and the polymerization catalyst are on separate supports, which can cause numerous undesirable issues in an industrial process, such as catalyst segregation and inhomogeneity of the reaction mixture in the reactor over time. Therefore, there is a need for a tandem LLDPE catalyst, wherein the trimerization catalyst and the polymerization catalyst are both co-supported on the same silica particles.

SUMMARY OF THE INVENTION

The following embodiments and aspects thereof are described and illustrated in conjunction with systems, compositions and methods which are meant to be exemplary and illustrative, not limiting in scope.

Various embodiments of the invention provide a supported catalyst system, comprising: a). a trimerization catalyst, wherein the trimerization catalyst is a cationic metal coordination complex of Formula Ia:

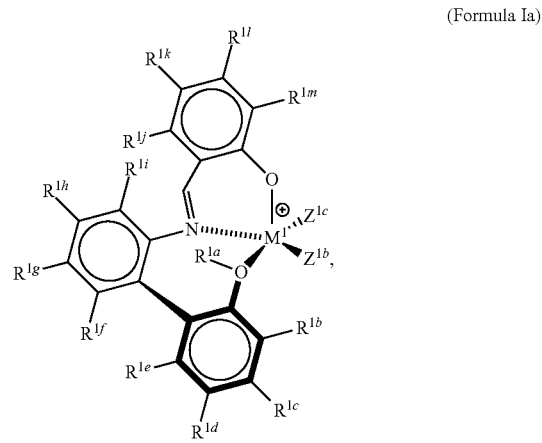

(Formula Ia)

wherein, $M^1$ is Ti, Zr, or Hf; $Z^{1b}$ and $Z^{1c}$ are independently hydrogen or an optionally substituted substituent; $R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl; $R^{1b}$, $R^{1c}$, $R^{1d}$, and $R^{1e}$ are independently hydrogen or an optionally substituted substituent; $R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent; b). a polymerization catalyst, wherein the polymerization catalyst is a cationic metal coordination complex of Formula IIa:

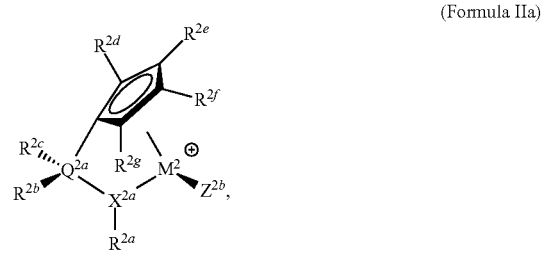

(Formula IIa)

wherein, $M^2$ is Ti, Zr, or Hf; $Z^{2b}$ is hydrogen or an optionally substituted substituent; $X^{2a}$ is O or N; $Q^{2a}$ is C or Si; $R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N; $R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent; and c). an activated solid support, wherein the trimerization catalyst and the polymerization catalyst are attached to the activated solid support. In some embodiments, the activated solid support comprises one or more negative charges. In some embodiments, the attachment of the trimerization catalyst and the polymerization catalyst to the activated solid support is by an electrostatic bond between the catalysts and the activated solid support. In some embodiments, $Z^{1b}$ and $Z^{1c}$ are independently selected from alkyl and substituted alkyl; $Z^{2b}$ is selected from alkyl and substituted alkyl; and $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl. In some embodiments, $M^1$ is Ti; $M^2$ is Ti; $Z^{1b}$ and $Z^{1c}$ are independently selected from alkyl and substituted alkyl; $Z^{2b}$ is selected from alkyl and substituted alkyl; and $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl. In some embodiments, $M^1$ is Ti; $Z^{1b}$ is methyl; $Z^{1c}$ is methyl; $M^2$ is Ti; and $Z^{2b}$ is methyl. In some embodiments, the cationic metal coordination complex of Formula Ia is:

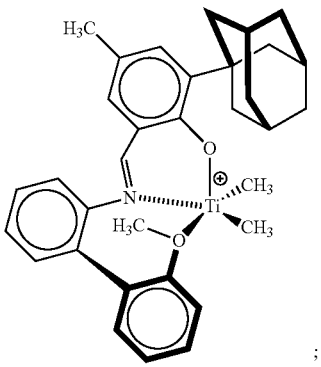

and the cationic metal coordination complex of Formula IIa is:

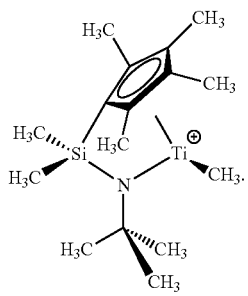

In some embodiments, the activated solid support comprises an activator and a solid support, wherein the activator is attached to the solid support. In some embodiments, the activator is an aluminum compound. In some embodiments, the aluminum compound is an organoaluminoxane. In some embodiments, the organoaluminoxane is an alkylaluminoxane. In some embodiments, the alkylaluminoxane is methylaluminoxane. In some embodiments, the activator is methylaluminoxane. In some embodiments, the solid support comprises an inorganic material, an organic material, or a combination thereof. In some embodiments, the inorganic material is selected from silica, alumina, silica-alumina, zeolites, clays, mica, talc, magnesia, titania, zirconia, magnesium dichloride-alcohol adduct, or combinations thereof.

In some embodiments, the inorganic material is silica. In some embodiments, the solid support is silica. In some embodiments, the activated solid support is a particulate activated solid support. In some embodiments, the particulate activated solid support is free-flowing and disintegrable. In some embodiments, the activated solid support comprises methylaluminoxane and silica, wherein the methylaluminoxane is attached to the silica. In some embodiments, a ratio of the polymerization catalyst to the trimerization catalyst is from about 9:1 to about 1:1. In some embodiments, the supported catalyst system is in the form of a slurry. In some embodiments, the supported catalyst system further comprises an optional solvent. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments, the optional solvent is toluene. In some embodiments, the trimerization catalyst and the polymerization catalyst are attached to the same activated solid support. In some embodiments, the activated solid support comprises one or more members, wherein the trimerization catalyst and the polymerization catalyst are attached to one or more of the same members. In some embodiments, the activated solid support is a particulate activated solid support comprising a plurality of particles, and the trimerization catalyst and the polymerization catalyst are attached to a same particle. In some embodiments, the activated solid support comprises one or more particles, wherein the trimerization catalyst and the polymerization catalyst are attached to one or more of the same particles. In some embodiments, the trimerization catalyst and the polymerization catalyst are both co-supported on the same activated solid support.

Various embodiments of the present invention provide a method to prepare a supported catalyst system, comprising: a). obtaining a solid support; b). contacting the solid support with an activator to obtain an activated solid support; and c). contacting the activated solid support with a precatalyst mixture, wherein the precatalyst mixture comprises a trimerization precatalyst, a polymerization precatalyst, and an optional solvent, wherein the trimerization precatalyst is a metal coordination complex of Formula I:

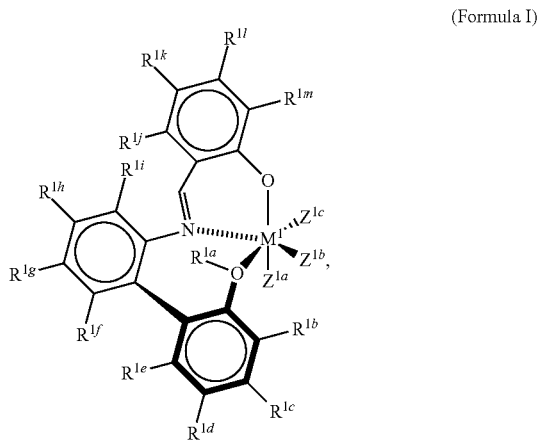

(Formula I)

wherein, $M^1$ is Ti, Zr, or Hf; $Z^{1a}$ $Z^{1b}$, and $Z^{1c}$ are independently hydrogen or an optionally substituted substituent; $R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl; $R^{1b}$, $R^{1c}$, $R^{1d}$, and $R^{1e}$ are independently hydrogen or an optionally substituted substituent; $R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent; and the polymerization precatalyst is a metal coordination complex of Formula II:

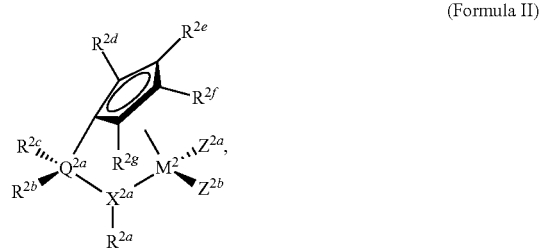

(Formula II)

wherein, $M^2$ is Ti, Zr, or Hf; $Z^{2a}$ and $Z^{2b}$ are independently hydrogen or an optionally substituted substituent; $X^{2a}$ is O or N; $Q^{2a}$ is C or Si; $R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N; $R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent. In some embodiments, $Z^{1a}$ $Z^{1b}$ and $Z^{1c}$ are independently selected from halogen, alkyl, and substituted alkyl; $Z^{2a}$ and $Z^{2b}$ are independently selected from halogen, alkyl, and substituted alkyl; and $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl. In some embodiments, $M^1$ is Ti; $M^2$ is Ti; $Z^{1a}$, $Z^{1b}$ and $Z^{1c}$ are independently selected from halogen, alkyl, and substituted alkyl; $Z^{2a}$ and $Z^{2b}$ are independently selected from halogen, alkyl, and substituted alkyl; and $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl. In some embodiments, $M^1$ is Ti; and $M^2$ is Ti. In some embodiments, the metal coordination complex of Formula I is:

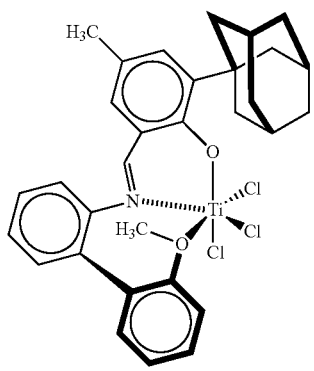

;

and the metal coordination complex of Formula II is:

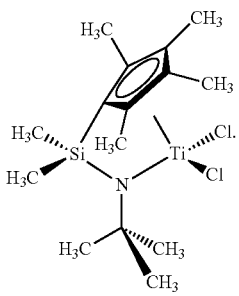

In some embodiments, the activator comprises an aluminum compound. In some embodiments, the aluminum compound is an organoaluminoxane. In some embodiments, the organoaluminoxane is an alkylaluminoxane. In some embodiments, the alkylaluminoxane is methylaluminoxane. In some embodiments, the activator is methylaluminoxane. In some embodiments, the solid support comprises an inorganic material, an organic material, or a combination thereof. In some embodiments, the inorganic material is selected from silica, alumina, silica-alumina, zeolites, clays, mica, talc, magnesia, titania, zirconia, magnesium dichloride-alcohol adduct, or combinations thereof. In some embodiments, the inorganic material is silica. In some embodiments, the solid support is silica. In some embodiments, the solid support is a particulate solid support. In some embodiments, the solid support is free-flowing and disintegrable. In some embodiments, a ratio of the polymerization precatalyst to the trimerization precatalyst is from about 9:1 to about 1:1. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments, the optional solvent is toluene. In some embodiments, the supported catalyst system comprises: a). a trimerization catalyst, wherein the trimerization catalyst is a cationic metal coordination complex of Formula Ia:

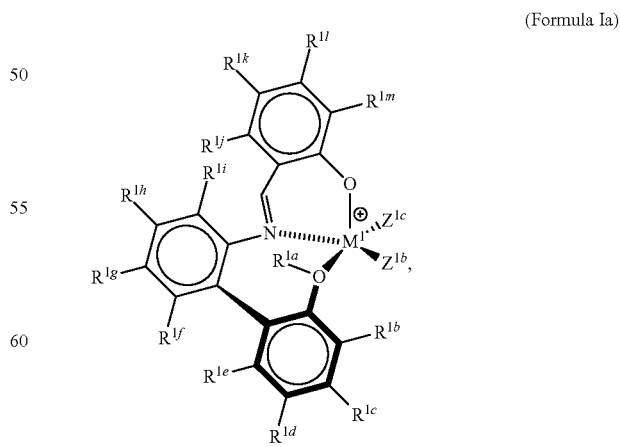

(Formula Ia)

wherein, $M^1$ is Ti, Zr, or Hf; $Z^{1b}$ and $Z^{1c}$ are independently hydrogen or an optionally substituted substituent; $R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl; $R^{1b}$, $R^{1c}$, $R^{1d}$, and $R^{1e}$ are independently hydrogen or an optionally substituted substituent; $R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent; b). a polymerization catalyst, wherein the polymerization catalyst is a cationic metal coordination complex of Formula IIa:

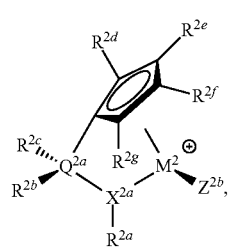

(Formula IIa)

wherein, $M^2$ is Ti, Zr, or Hf; $Z^{2b}$ is hydrogen or an optionally substituted substituent; $X^{2a}$ is O or N; $Q^{2a}$ is C or Si; $R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N; $R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent; and c). an activated solid support, wherein the trimerization catalyst and the polymerization catalyst are attached to the activated solid support. In some embodiments, the trimerization catalyst and the polymerization catalyst are attached to the same activated solid support. In some embodiments, the activated solid support comprises one or more members, wherein the trimerization catalyst and the polymerization catalyst are attached to one or more of the same members. In some embodiments, the activated solid support is a particulate activated solid support comprising a plurality of particles, and the trimerization catalyst and the polymerization catalyst are attached to a same particle. In some embodiments, the activated solid support comprises one or more particles, wherein the trimerization catalyst and the polymerization catalyst are attached to one or more of the same particles. In some embodiments, the trimerization catalyst and the polymerization catalyst are both co-supported on the same activated solid support.

Various embodiments of the present invention provide a method for the preparation of a linear low density polyethylene (LLDPE) polymer, comprising: a). providing a supported catalyst system; and b). contacting the supported catalyst system with ethylene under conditions effective to promote the tandem trimerization and polymerization of ethylene to form the linear low density polyethylene polymer, wherein the supported catalyst system comprises: a trimerization catalyst, wherein the trimerization catalyst is a cationic metal coordination complex of Formula Ia:

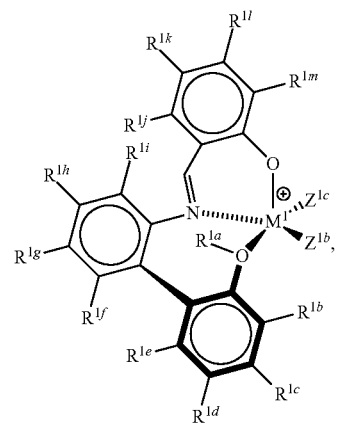

(Formula Ia)

wherein, $M^1$ is Ti, Zr, or Hf; $Z^{1b}$ and $Z^{1c}$ are independently hydrogen or an optionally substituted substituent; $R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl; $R^{1b}$, $R^{1c}$, $R^{1d}$, and $R^{1e}$ are independently hydrogen or an optionally substituted substituent; $R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent; b). a polymerization catalyst, wherein the polymerization catalyst is a cationic metal coordination complex of Formula IIa:

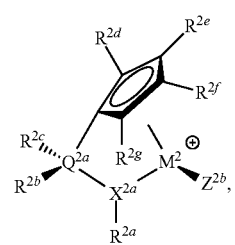

(Formula IIa)

wherein, $M^2$ is Ti, Zr, or Hf; $Z^{2b}$ is hydrogen or an optionally substituted substituent; $X^{2a}$ is O or N; $Q^{2a}$ is C or Si; $R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N; $R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent; and c). an activated solid support, wherein the trimerization catalyst and the polymerization catalyst are attached to the activated solid support. In some embodiments, the activated solid support comprises one or more negative charges. In some embodiments, the attachment of the trimerization catalyst and the polymerization catalyst to the activated solid support is by an electrostatic bond between the catalysts and the activated solid support. In some embodiments, $Z^{1b}$ and $Z^{1c}$ are independently selected from alkyl and substituted alkyl; $Z^{2b}$ is selected from alkyl and substituted alkyl; and $R^{2b}$ and $R^{2c}$ are independently selected from hydrogen, alkyl, substituted alkyl, aryl, substituted aryl, heteroalkyl, substituted heteroaryl, heteroaryl, substituted heteroaryl, cyclyl, substituted cyclyl, heterocyclyl, and substituted heterocyclyl. In some embodiments, $M^1$ is Ti; $M^2$ is Ti; $Z^{1b}$ and $Z^{1c}$ are independently selected from alkyl and substituted alkyl; $Z^{2b}$ is selected from alkyl and substituted alkyl; and $R^{2b}$ and $R^{2c}$ are independently selected from hydrogen, alkyl, substituted alkyl, aryl, substituted aryl, heteroalkyl, substituted heteroaryl, heteroaryl, substituted heteroaryl, cyclyl, substituted cyclyl, heterocyclyl, and substituted heterocyclyl. In some embodiments, $M^1$ is Ti; $Z^{1b}$ is methyl; $Z^{1c}$ is methyl; $M^2$ is Ti; and $Z^{2b}$ is methyl. In some embodiments, the cationic metal coordination complex of Formula Ia is:

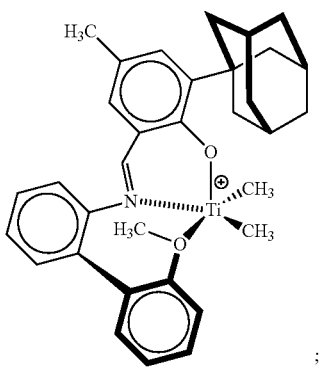

and the cationic metal coordination complex of Formula IIa is:

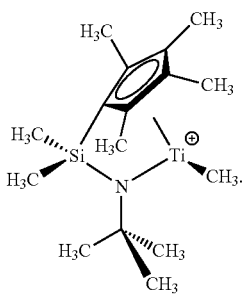

In some embodiments, the activated solid support comprises an activator and a solid support, wherein the activator is attached to the solid support. In some embodiments, the activator is an aluminum compound. In some embodiments, the aluminum compound is an organoaluminoxane. In some embodiments, the organoaluminoxane is an alkylaluminoxane. In some embodiments, the alkylaluminoxane is methylaluminoxane. In some embodiments, the activator is methylaluminoxane. In some embodiments, the solid support comprises an inorganic material, an organic material, or a combination thereof. In some embodiments, the inorganic material is selected from silica, alumina, silica-alumina, zeolites, clays, mica, talc, magnesia, titania, zirconia, magnesium dichloride-alcohol adduct, or combinations thereof. In some embodiments, the inorganic material is silica. In some embodiments, the solid support is silica. In some embodiments, the activated solid support is a particulate activated solid support. In some embodiments, the particulate activated solid support is free-flowing and disintegrable. In some embodiments, the activated solid support comprises methylaluminoxane and silica, wherein the methylaluminoxane is attached to the silica. In some embodiments, a ratio of the polymerization catalyst to the trimerization catalyst is from about 9:1 to about 1:1. In some embodiments, the supported catalyst further comprises an optional solvent. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments, the optional solvent is toluene. In some embodiments, the supported catalyst system is in the form of a slurry. In some embodiments, the method is performed in the presence of an optional solvent. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments, the optional solvent is toluene. In some embodiments, the method is performed in the absence of a solvent. In some embodiments, the linear low density polyethylene polymer is a copolymer of ethylene and 1-hexene. In some embodiments, the amount of 1-hexene is from about 0.1 mol % to about 99 mol % of the copolymer. In some embodiments, the linear low density polyethylene polymer has a weight average molecular weight ($M_w$) from about 10,000 Da to about 3,000,000 Da. In some embodiments, the low linear density polyethylene has a crystallinity of about 1% to about 30%. In some embodiments, the ethylene has a purity of >95%. In some embodiments, the conditions comprise ethylene at ≥1 atmosphere pressure. In some embodiments, the conditions comprise ethylene at ≥4 atmosphere pressure. In some embodiments, the trimerization catalyst and the polymerization catalyst are attached to the same activated solid support. In some embodiments, the activated solid support comprises one or more members, wherein the trimerization catalyst and the polymerization catalyst are attached to one or more of the same members. In some embodiments, the activated solid support is a particulate activated solid support comprising a plurality of particles, and the trimerization catalyst and the polymerization catalyst are attached to a same particle. In some embodiments, the activated solid support comprises one or more particles, wherein the trimerization catalyst and the polymerization catalyst are attached to one or more of the same particles. In some embodiments, the trimerization catalyst and the polymerization catalyst are both co-supported on the same activated solid support.

Various embodiments of the present invention provide a method for the preparation of a linear low density polyethylene (LLDPE) polymer, comprising: a). providing a supported catalyst system; and b). contacting the supported catalyst system with ethylene under conditions effective to promote the trimerization and polymerization of ethylene to form the linear low density polyethylene polymer, wherein the supported catalyst system comprises: a trimerization catalyst, wherein the trimerization catalyst is a cationic metal coordination complex of Formula Ia:

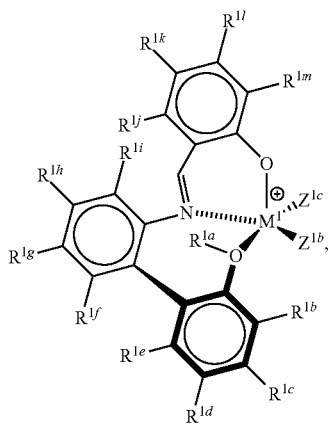

(Formula Ia)

wherein, $M^1$ is Ti, Zr, or Hf; $Z^{1b}$ and $Z^{1c}$ are independently hydrogen or an optionally substituted substituent; $R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl; $R^{1b}$, $R^{1c}$, $R^{1d}$, and $R^{1e}$ are independently hydrogen or an optionally substituted substituent; $R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent; b). a polymerization catalyst, wherein the polymerization catalyst is a cationic metal coordination complex of Formula IIa:

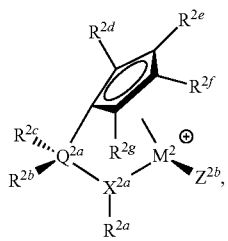

(Formula IIa)

wherein, $M^2$ is Ti, Zr, or Hf; $Z^{2b}$ is hydrogen or an optionally substituted substituent; $X^{2a}$ is O or N; $Q^{2a}$ is C or Si; $R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N; $R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent; and c). an activated solid support, wherein the trimerization catalyst and the polymerization catalyst are attached to the activated solid support. In some embodiments, the activated solid support comprises one or more negative charges. In some embodiments, the attachment of the trimerization catalyst and the polymerization catalyst to the activated solid support is by an electrostatic bond between the catalysts and the activated solid support. In some embodiments, $Z^{1b}$ and $Z^{1c}$ are independently selected from alkyl and substituted alkyl; $Z^{2b}$ is selected from alkyl and substituted alkyl; and $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl. In some embodiments, $M^1$ is Ti; $M^2$ is Ti; $Z^{1b}$ and $Z^{1c}$ are independently selected from alkyl and substituted alkyl; $Z^{2b}$ is selected from alkyl and substituted alkyl; and $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl. In some embodiments, $M^1$ is Ti; $Z^{1b}$ is methyl; $Z^{1c}$ is methyl; $M^2$ is Ti; and $Z^{2b}$ is methyl. In some embodiments, the cationic metal coordination complex of Formula Ia is:

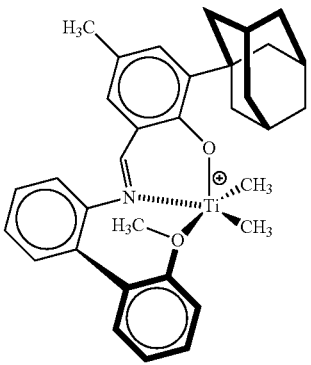

;

and the cationic metal coordination complex of Formula IIa is:

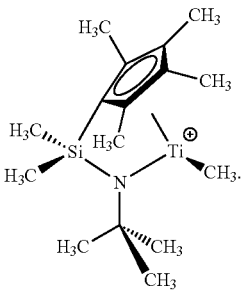

In some embodiments, the activated solid support comprises an activator and a solid support, wherein the activator is attached to the solid support. In some embodiments, the activator is an aluminum compound. In some embodiments, the aluminum compound is an organoaluminoxane. In some embodiments, the organoaluminoxane is an alkylaluminoxane. In some embodiments, the alkylaluminoxane is methylaluminoxane. In some embodiments, the activator is methylaluminoxane. In some embodiments, the solid support comprises an inorganic material, an organic material, or a combination thereof. In some embodiments, the inorganic material is selected from silica, alumina, silica-alumina, zeolites, clays, mica, talc, magnesia, titania, zirconia, magnesium dichloride-alcohol adduct, or combinations thereof. In some embodiments, the inorganic material is silica. In some embodiments, the solid support is silica. In some embodiments, the activated solid support is a particulate activated solid support. In some embodiments, the particulate activated solid support is free-flowing and disintegrable. In some embodiments, the activated solid support comprises methylaluminoxane and silica, wherein the methylaluminoxane is attached to the silica. In some embodiments, a ratio of the polymerization catalyst to the trimerization catalyst is from about 9:1 to about 1:1. In some embodiments, the supported catalyst further comprises an optional solvent. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments, the optional solvent is toluene. In some embodiments, the supported catalyst system is in the form of a slurry. In some embodiments, the method is performed in the presence of an optional solvent. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments, the optional solvent is toluene. In some embodiments, the method is performed in the absence of a solvent. In some embodiments, the linear low density polyethylene polymer is a copolymer of ethylene and 1-hexene. In some embodiments, the amount of 1-hexene is from about 0.1 mol % to about 99 mol % of the copolymer. In some embodiments, the linear low density polyethylene polymer has a weight average molecular weight ($M_w$) from about 10,000 Da to about 3,000,000 Da. In some embodiments, the low linear density polyethylene has a crystallinity of about 1% to about 30%. In some embodiments, the ethylene has a purity of >95%. In some embodiments, the conditions comprise ethylene at ≥1 atmosphere pressure. In some embodiments, the conditions comprise ethylene at ≥4 atmosphere pressure. In some embodiments, the trimerization catalyst and the polymerization catalyst are attached to the same activated solid support. In some embodiments, the activated solid support comprises one or more members, wherein the trimerization catalyst and the polymerization catalyst are attached to one or more of the same members. In some embodiments, the activated solid support is a particulate activated solid support comprising a plurality of particles, and the trimerization catalyst and the polymerization catalyst are attached to a same particle. In some embodiments, the activated solid support comprises one or more particles, wherein the trimerization catalyst and the polymerization catalyst are attached to one or more of the same particles. In some embodiments, the trimerization catalyst and the polymerization catalyst are both co-supported on the same activated solid support.

BRIEF DESCRIPTION OF THE DRAWINGS

Exemplary embodiments are illustrated in referenced figures. It is intended that the embodiments and figures disclosed herein are to be considered illustrative rather than restrictive.

DETAILED DESCRIPTION OF THE INVENTION

Figure 1:
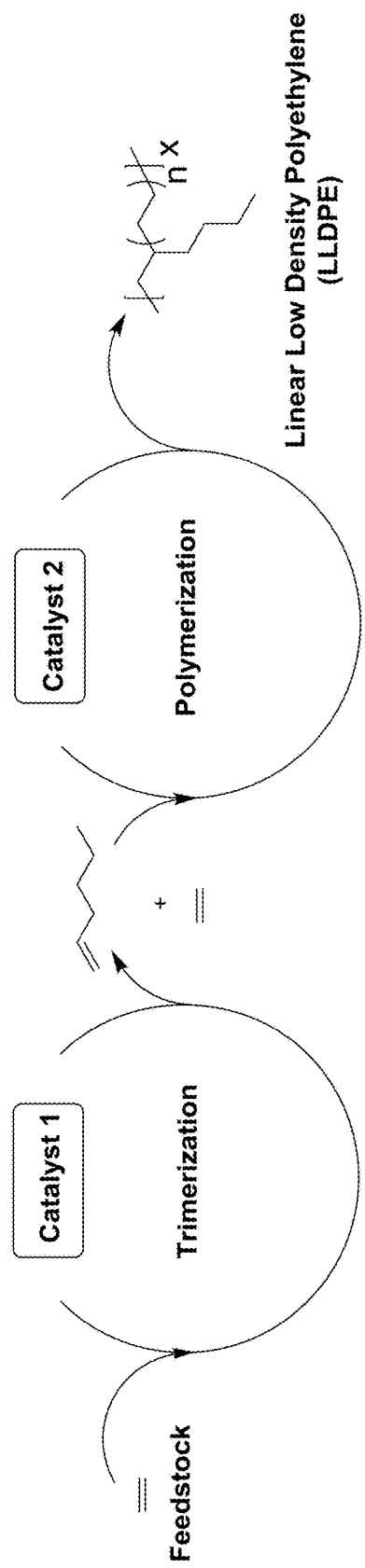
FIG. 1 depicts in accordance with various embodiments of the invention, orthogonal tandem catalysis, where two independent catalysts operate together to perform consecutive transformations in a single reactor.

All references cited herein are incorporated by reference in their entirety as though fully set forth. Unless defined otherwise, technical and scientific terms used herein have the same meaning as commonly understood by one of ordinary skill in the art to which this invention belongs.

One skilled in the art will recognize many methods and materials similar or equivalent to those described herein, which could be used in the practice of the present invention. Other features and advantages of the invention will become apparent from the following detailed description, taken in conjunction with the accompanying drawings, which illustrate, by way of example, various features of embodiments of the invention. Indeed, the present invention is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this invention belongs. It should be understood that this invention is not limited to the particular methodology, protocols, and reagents, etc., described herein and as such can vary. The definitions and terminology used herein are provided to aid in describing particular embodiments, and are not intended to limit the claimed invention, because the scope of the invention is limited only by the claims.

As used herein the term "comprising" or "comprises" is used in reference to compositions, methods, systems, articles of manufacture, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

As used herein, the term "alkyl" means a straight or branched, saturated aliphatic radical having a chain of carbon atoms. $C_x$ alkyl and $C_x$-$C_y$alkyl are typically used where X and Y indicate the number of carbon atoms in the chain. For example, $C_1$-$C_6$alkyl includes alkyls that have a chain of between 1 and 6 carbons (e.g., methyl, ethyl, propyl, isopropyl, butyl, sec-butyl, isobutyl, tert-butyl, pentyl, neopentyl, hexyl, and the like). Alkyl represented along with another radical (e.g., as in arylalkyl) means a straight or branched, saturated alkyl divalent radical having the number of atoms indicated or when no atoms are indicated means a bond, e.g., ($C_6$-$C_{10}$)aryl($C_0$-$C_3$)alkyl includes phenyl, benzyl, phenethyl, 1-phenylethyl 3-phenylpropyl, and the like. Backbone of the alkyl can be optionally inserted with one or more heteroatoms, such as N, O, or S.

In preferred embodiments, a straight chain or branched chain alkyl has 30 or fewer carbon atoms in its backbone (e.g., C1-C30 for straight chains, C3-C30 for branched chains), and more preferably 20 or fewer. Likewise, preferred cycloalkyls have from 3-10 carbon atoms in their ring structure, and more preferably have 5, 6 or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone.

Unless the number of carbons is otherwise specified, "lower alkyl" as used herein means an alkyl group, as defined above, but having from one to ten carbons, more preferably from one to six carbon atoms in its backbone structure. Likewise, "lower alkenyl" and "lower alkynyl" have similar chain lengths. Throughout the application, preferred alkyl groups are lower alkyls. In preferred embodiments, a substituent designated herein as alkyl is a lower alkyl.

Non-limiting examples of substituents of a substituted alkyl can include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like.

As used herein, the term "alkenyl" refers to unsaturated straight-chain, branched-chain or cyclic hydrocarbon radicals having at least one carbon-carbon double bond. $C_x$ alkenyl and $C_x$-$C_y$alkenyl are typically used where X and Y indicate the number of carbon atoms in the chain. For example, $C_2$-$C_6$alkenyl includes alkenyls that have a chain of between 2 and 6 carbons and at least one double bond, e.g., vinyl, allyl, propenyl, isopropenyl, 1-butenyl, 2-butenyl, 3-butenyl, 2-methylallyl, 1-hexenyl, 2-hexenyl, 3-hexenyl, and the like). Alkenyl represented along with another radical (e.g., as in arylalkenyl) means a straight or branched, alkenyl divalent radical having the number of atoms indicated. Backbone of the alkenyl can be optionally inserted with one or more heteroatoms, such as N, O, or S.

As used herein, the term "alkynyl" refers to unsaturated hydrocarbon radicals having at least one carbon-carbon triple bond. $C_x$ alkynyl and $C_x$-$C_y$alkynyl are typically used where X and Y indicate the number of carbon atoms in the chain. For example, $C_2$-$C_6$alkynyl includes alkynls that have a chain of between 2 and 6 carbons and at least one triple bond, e.g., ethynyl, 1-propynyl, 2-propynyl, 1-butynyl, isopentynyl, 1,3-hexa-diyn-yl, n-hexynyl, 3-pentynyl, 1-hexen-3-ynyl and the like. Alkynyl represented along with another radical (e.g., as in arylalkynyl) means a straight or branched, alkynyl divalent radical having the number of atoms indicated. Backbone of the alkynyl can be optionally inserted with one or more heteroatoms, such as N, O, or S.

The terms "alkylene," "alkenylene," and "alkynylene" refer to divalent alkyl, alkelyne, and alkynylene" radicals. Prefixes $C_x$ and $C_x$-$C_y$ are typically used where X and Y indicate the number of carbon atoms in the chain. For example, $C_1$-$C_6$alkylene includes methylene, (—$CH_2$—), ethylene (—$CH_2CH_2$—), trimethylene (—$CH_2CH_2CH_2$—), tetramethylene (—$CH_2CH_2CH_2CH_2$—), 2-methyltetramethylene (—$CH_2CH(CH_3)CH_2CH_2$—), pentamethylene (—$CH_2CH_2CH_2CH_2CH_2$—) and the like).

As used herein, the term "alkylidene" means a straight or branched unsaturated, aliphatic, divalent radical having a general formula=$CR_aR_b$. Non-limiting examples of $R_a$ and $R_b$ are each independently hydrogen, alkyl, substituted alkyl, alkenyl, or substituted alkenyl. $C_x$ alkylidene and $C_x$-$C_y$alkylidene are typically used where X and Y indicate the number of carbon atoms in the chain. For example, $C_2$-$C_6$alkylidene includes methylidene (=$CH_2$), ethylidene (=$CHCH_3$), isopropylidene (=$C(CH_3)_2$), propylidene (=$CHCH_2CH_3$), allylidene (=CH—CH=$CH_2$), and the like).

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

As used herein, the term "halogen" or "halo" refers to an atom selected from fluorine, chlorine, bromine and iodine. The term "halogen radioisotope" or "halo isotope" refers to a radionuclide of an atom selected from fluorine, chlorine, bromine and iodine.

A "halogen-substituted moiety" or "halo-substituted moiety", as an isolated group or part of a larger group, means an aliphatic, alicyclic, or aromatic moiety, as described herein, substituted by one or more "halo" atoms, as such terms are defined in this application. For example, halo-substituted alkyl includes haloalkyl, dihaloalkyl, trihaloalkyl, perhaloalkyl and the like (e.g. halosubstituted $(C_1-C_3)$alkyl includes chloromethyl, dichloromethyl, difluoromethyl, trifluoromethyl (—$CF_3$), 2,2,2-trifluoroethyl, perfluoroethyl, 2,2,2-trifluoro-1,1-dichloroethyl, and the like).

The term "aryl" refers to monocyclic, bicyclic, or tricyclic fused aromatic ring system. $C_x$ aryl and $C_x$-$C_y$aryl are typically used where X and Y indicate the number of carbon atoms in the ring system. For example, $C_6$-$C_{12}$ aryl includes aryls that have 6 to 12 carbon atoms in the ring system. Exemplary aryl groups include, but are not limited to, pyridinyl, pyrimidinyl, furanyl, thienyl, imidazolyl, thiazolyl, pyrazolyl, pyridazinyl, pyrazinyl, triazinyl, tetrazolyl, indolyl, benzyl, phenyl, naphthyl, anthracenyl, azulenyl, fluorenyl, indanyl, indenyl, naphthyl, phenyl, tetrahydronaphthyl, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl, and the like. In some embodiments, 1, 2, 3, or 4 hydrogen atoms of each ring can be substituted by a substituent.

The term "heteroaryl" refers to an aromatic 5-8 membered monocyclic, 8-12 membered fused bicyclic, or 11-14 membered fused tricyclic ring system having 1-3 heteroatoms if monocyclic, 1-6 heteroatoms if bicyclic, or 1-9 heteroatoms if tricyclic, said heteroatoms selected from O, N, or S (e.g., carbon atoms and 1-3, 1-6, or 1-9 heteroatoms of N, O, or S if monocyclic, bicyclic, or tricyclic, respectively. $C_x$ heteroaryl and $C_x$-$C_y$heteroaryl are typically used where X and Y indicate the number of carbon atoms in the ring system. For example, $C_4$-$C_9$ heteroaryl includes heteroaryls that have 4 to 9 carbon atoms in the ring system. Heteroaryls include, but are not limited to, those derived from benzo[b] furan, benzo[b] thiophene, benzimidazole, imidazo[4,5-c] pyridine, quinazoline, thieno[2,3-c]pyridine, thieno[3,2-b]pyridine, thieno[2, 3-b]pyridine, indolizine, imidazo[1,2a] pyridine, quinoline, isoquinoline, phthalazine, quinoxaline, naphthyridine, quinolizine, indole, isoindole, indazole, indoline, benzoxazole, benzopyrazole, benzothiazole, imidazo[1, 5-a]pyridine, pyrazolo[1,5-a]pyridine, imidazo[1,2-a]pyrimidine, imidazo[1,2-c]pyrimidine, imidazo[1,5-a] pyrimidine, imidazo[1,5-c]pyrimidine, pyrrolo[2,3-b] pyridine, pyrrolo[2,3c]pyridine, pyrrolo[3,2-c]pyridine, pyrrolo[3,2-b]pyridine, pyrrolo[2,3-d]pyrimidine, pyrrolo [3,2-d]pyrimidine, pyrrolo [2,3-b]pyrazine, pyrazolo[1,5-a] pyridine, pyrrolo[1,2-b]pyridazine, pyrrolo[1,2-c]pyrimidine, pyrrolo[1,2-a]pyrimidine, pyrrolo[1,2-a]pyrazine, triazo[1,5-a]pyridine, pteridine, purine, carbazole, acridine, phenazine, phenothiazene, phenoxazine, 1,2-dihydropyrrolo [3,2,1-hi]indole, indolizine, pyrido[1,2-a]indole, 2(1H)-pyridinone, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2, 5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. Some exemplary heteroaryl groups include, but are not limited to, pyridyl, furyl or furanyl, imidazolyl, benzimidazolyl, pyrimidinyl, thiophenyl or thienyl, pyridazinyl, pyrazinyl, quinolinyl, indolyl, thiazolyl, naphthyridinyl, 2-amino-4-oxo-3,4-dihydropteridin-6-yl, tetrahydroisoquinolinyl, and the like. In some embodiments, 1, 2, 3, or 4 hydrogen atoms of each ring may be substituted by a substituent.

The term "cyclyl" or "cycloalkyl" refers to saturated and partially unsaturated cyclic hydrocarbon groups having 3 to 12 carbons, for example, 3 to 8 carbons, and, for example, 3 to 6 carbons. $C_x$cyclyl and $C_x$-$C_y$cycyl are typically used where X and Y indicate the number of carbon atoms in the ring system. For example, $C_3$-$C_8$ cyclyl includes cyclyls that have 3 to 8 carbon atoms in the ring system. The cycloalkyl group additionally can be optionally substituted, e.g., with 1, 2, 3, or 4 substituents. $C_3$-$C_{10}$cyclyl includes cyclopropyl, cyclobutyl, cyclopentyl, cyclohexyl, cyclohexenyl, 2,5-cyclohexadienyl, cycloheptyl, cyclooctyl, bicyclo[2.2.2]octyl, adamantan-1-yl, decahydronaphthyl, oxocyclohexyl, dioxocyclohexyl, thiocyclohexyl, 2-oxobicyclo [2.2.1]hept-1-yl, and the like.

Aryl and heteroaryls can be optionally substituted with one or more substituents at one or more positions, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —CF3, —CN, or the like.

The term "heterocyclyl" refers to a nonaromatic 4-8 membered monocyclic, 8-12 membered bicyclic, or 11-14 membered tricyclic ring system having 1-3 heteroatoms if monocyclic, 1-6 heteroatoms if bicyclic, or 1-9 heteroatoms if tricyclic, said heteroatoms selected from O, N, or S (e.g., carbon atoms and 1-3, 1-6, or 1-9 heteroatoms of N, O, or S if monocyclic, bicyclic, or tricyclic, respectively). $C_x$heterocyclyl and $C_x$-$C_y$heterocyclyl are typically used where X and Y indicate the number of carbon atoms in the ring system. For example, $C_4$-$C_9$ heterocyclyl includes heterocyclyls that have 4-9 carbon atoms in the ring system. In some embodiments, 1, 2 or 3 hydrogen atoms of each ring can be substituted by a substituent. Exemplary heterocyclyl groups include, but are not limited to piperazinyl, pyrrolidinyl, dioxanyl, morpholinyl, tetrahydrofuranyl, piperidyl, 4-morpholyl, 4-piperazinyl, pyrrolidinyl, perhydropyrrolizinyl, 1,4-diazaperhydroepinyl, 1,3-dioxanyl, 1,4-dioxanyland the like.

The terms "bicyclic" and "tricyclic" refers to fused, bridged, or joined by a single bond polycyclic ring assemblies.

The term "cyclylalkylene" means a divalent aryl, heteroaryl, cyclyl, or heterocyclyl.

As used herein, the term "fused ring" refers to a ring that is bonded to another ring to form a compound having a bicyclic structure when the ring atoms that are common to both rings are directly bound to each other. Non-exclusive examples of common fused rings include decalin, naphthalene, anthracene, phenanthrene, indole, furan, benzofuran, quinoline, and the like. Compounds having fused ring systems can be saturated, partially saturated, cyclyl, heterocyclyl, aromatics, heteroaromatics, and the like.

As used herein, the term "carbonyl" means the radical —C(O)—. It is noted that the carbonyl radical can be further substituted with a variety of substituents to form different carbonyl groups including acids, acid halides, amides, esters, ketones, and the like.

The term "carboxy" means the radical —C(O)O—. It is noted that compounds described herein containing carboxy moieties can include protected derivatives thereof, i.e., where the oxygen is substituted with a protecting group. Suitable protecting groups for carboxy moieties include benzyl, tert-butyl, and the like. The term "carboxyl" means —COOH.

The term "cyano" means the radical —CN.

The term, "heteroatom" refers to an atom that is not a carbon atom. Particular examples of heteroatoms include, but are not limited to nitrogen, oxygen, sulfur and halogens. A "heteroatom moiety" includes a moiety where the atom by which the moiety is attached is not a carbon. Examples of heteroatom moieties include —N=, —$NR^N$—, —$N^+$($O^-$)=, —O—, —S— or —S(O)$_2$—, —OS(O)$_2$—, and —SS—, wherein $R^N$ is H or a further substituent.

The term "hydroxy" means the radical —OH.

The term "imine derivative" means a derivative comprising the moiety —C(NR)—, wherein R comprises a hydrogen or carbon atom alpha to the nitrogen.

The term "nitro" means the radical —NO$_2$.

An "oxaaliphatic," "oxaalicyclic", or "oxaaromatic" mean an aliphatic, alicyclic, or aromatic, as defined herein, except where one or more oxygen atoms (—O—) are positioned between carbon atoms of the aliphatic, alicyclic, or aromatic respectively.

An "oxoaliphatic," "oxoalicyclic", or "oxoaromatic" means an aliphatic, alicyclic, or aromatic, as defined herein, substituted with a carbonyl group. The carbonyl group can be an aldehyde, ketone, ester, amide, acid, or acid halide.

As used herein, the term, "aromatic" means a moiety wherein the constituent atoms make up an unsaturated ring system, all atoms in the ring system are sp$^2$ hybridized and the total number of pi electrons is equal to 4n+2. An aromatic ring canbe such that the ring atoms are only carbon atoms (e.g., aryl) or can include carbon and non-carbon atoms (e.g., heteroaryl).

As used herein, the term "substituted" refers to independent replacement of one or more (typically 1, 2, 3, 4, or 5) of the hydrogen atoms on the substituted moiety with substituents independently selected from the group of substituents listed below in the definition for "substituents" or otherwise specified. In general, a non-hydrogen substituent can be any substituent that can be bound to an atom of the given moiety that is specified to be substituted. Examples of substituents include, but are not limited to, acyl, acylamino, acyloxy, aldehyde, alicyclic, aliphatic, alkanesulfonamido, alkanesulfonyl, alkaryl, alkenyl, alkoxy, alkoxycarbonyl, alkyl, alkylamino, alkylcarbanoyl, alkylene, alkylidene, alkylthios, alkynyl, amide, amido, amino, aminoalkyl, aralkyl, aralkylsulfonamido, arenesulfonamido, arenesulfonyl, aromatic, aryl, arylamino, arylcarbanoyl, aryloxy, azido, carbamoyl, carbonyl, carbonyls including ketones, carboxy, carboxylates, CF$_3$, cyano (CN), cycloalkyl, cycloalkylene, ester, ether, haloalkyl, halogen, halogen, heteroaryl, heterocyclyl, hydroxy, hydroxyalkyl, imino, iminoketone, ketone, mercapto, nitro, oxaalkyl, oxo, oxoalkyl, phosphoryl (including phosphonate and phosphinate), silyl groups, sulfonamido, sulfonyl (including sulfate, sulfamoyl and sulfonate), thiols, and ureido moieties, each of which may optionally also be substituted or unsubstituted. In some cases, two substituents, together with the carbon(s) to which they are attached to, can form a ring.

Substituents may be protected as necessary and any of the protecting groups commonly used in the art may be employed. Non-limiting examples of protecting groups may be found, for example, in Greene et al., Protective Groups in Organic Synthesis, 3rd Ed. (New York: Wiley, 1999).

The terms "alkoxyl" or "alkoxy" as used herein refers to an alkyl group, as defined above, having an oxygen radical attached thereto. Representative alkoxyl groups include methoxy, ethoxy, propyloxy, tert-butoxy, n-propyloxy, isopropyloxy, n-butyloxy, iso-butyloxy, and the like. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O-alkynyl. Aroxy can be represented by —O-aryl or O-heteroaryl, wherein aryl and heteroaryl are as defined below. The alkoxy and aroxy groups can be substituted as described above for alkyl.

The term "aralkyl", as used herein, refers to an alkyl group substituted with an aryl group (e.g., an aromatic or heteroaromatic group).

The term "alkylthio" refers to an alkyl group, as defined above, having a sulfur radical attached thereto. In preferred embodiments, the "alkylthio" moiety is represented by one of —S-alkyl, —S-alkenyl, and —S-alkynyl. Representative alkylthio groups include methylthio, ethylthio, and the like. The term "alkylthio" also encompasses cycloalkyl groups, alkene and cycloalkene groups, and alkyne groups. "Arylthio" refers to aryl or heteroaryl groups.

The term "sulfinyl" means the radical —SO—. It is noted that the sulfinyl radical can be further substituted with a variety of substituents to form different sulfinyl groups including sulfinic acids, sulfinamides, sulfinyl esters, sulfoxides, and the like.

The term "sulfonyl" means the radical —SO$_2$—. It is noted that the sulfonyl radical can be further substituted with a variety of substituents to form different sulfonyl groups including sulfonic acids (—SO$_3$H), sulfonamides, sulfonate esters, sulfones, and the like.

The term "thiocarbonyl" means the radical —C(S)—. It is noted that the thiocarbonyl radical can be further substituted with a variety of substituents to form different thiocarbonyl groups including thioacids, thioamides, thioesters, thioketones, and the like.

As used herein, the term "amino" means —NH$_2$. The term "alkylamino" means a nitrogen moiety having at least one straight or branched unsaturated aliphatic, cyclyl, or heterocyclyl radicals attached to the nitrogen. For example, representative amino groups include —NH$_2$, —NHCH$_3$, —N(CH$_3$)$_2$, —N(C$_1$-C$_{10}$alkyl)$_2$, and the like. The term "alkylamino" includes "alkenylamino," "alkynylamino," "cyclylamino," and "heterocyclylamino." The term "arylamino" means a nitrogen moiety having at least one aryl radical attached to the nitrogen. For example —NHaryl, and —N(aryl)$_2$. The term "heteroarylamino" means a nitrogen moiety having at least one heteroaryl radical attached to the nitrogen. For example —NHheteroaryl, and —N(heteroaryl)$_2$. Optionally, two substituents together with the nitrogen can also form a ring. Unless indicated otherwise, the compounds described herein containing amino moieties can include protected derivatives thereof. Suitable protecting groups for amino moieties include acetyl, tertbutoxycarbonyl, benzyloxycarbonyl, and the like.

The term "aminoalkyl" means an alkyl, alkenyl, and alkynyl as defined above, except where one or more substituted or unsubstituted nitrogen atoms (—N—) are positioned between carbon atoms of the alkyl, alkenyl, or alkynyl. For example, an (C$_2$-C$_6$) aminoalkyl refers to a chain comprising between 2 and 6 carbons and one or more nitrogen atoms positioned between the carbon atoms.

The term "alkoxyalkoxy" means —O-(alkyl)-O-(alkyl), such as —OCH$_2$CH$_2$OCH$_3$, and the like.

The term "alkoxycarbonyl" means —C(O)O-(alkyl), such as —C(=O)OCH$_3$, —C(=O)OCH$_2$CH$_3$, and the like.

The term "alkoxyalkyl" means -(alkyl)-O-(alkyl), such as —CH$_2$OCH$_3$, —CH$_2$OCH$_2$CH$_3$, and the like.

The term "aryloxy" means —O-(aryl), such as —O-phenyl, —O-pyridinyl, and the like.

The term "arylalkyl" means -(alkyl)-(aryl), such as benzyl (i.e., —CH$_2$phenyl), —CH$_2$-pyrindinyl, and the like.

The term "arylalkyloxy" means —O-(alkyl)-(aryl), such as —O-benzyl, —O—CH$_2$-pyridinyl, and the like.

The term "cycloalkyloxy" means —O-(cycloalkyl), such as —O-cyclohexyl, and the like.

The term "cycloalkylalkyloxy" means —O-(alkyl)-(cycloalkyl, such as —OCH$_2$cyclohexyl, and the like.

The term "aminoalkoxy" means —O-(alkyl)-NH$_2$, such as —OCH$_2$NH$_2$, —OCH$_2$CH$_2$NH$_2$, and the like.

The term "mono- or di-alkylamino" means —NH(alkyl) or —N(alkyl)(alkyl), respectively, such as —NHCH$_3$, —N(CH$_3$)$_2$, and the like.

The term "mono- or di-alkylaminoalkoxy" means —O-(alkyl)-NH(alkyl) or —O-(alkyl)-N(alkyl)(alkyl), respectively, such as —OCH$_2$NHCH$_3$, —OCH$_2$CH$_2$N(CH$_3$)$_2$, and the like.

The term "arylamino" means —NH(aryl), such as —NH-phenyl, —NH-pyridinyl, and the like.

The term "arylalkylamino" means —NH-(alkyl)-(aryl), such as —NH-benzyl, —NHCH$_2$— pyridinyl, and the like.

The term "alkylamino" means —NH(alkyl), such as —NHCH$_3$, —NHCH$_2$CH$_3$, and the like.

The term "cycloalkylamino" means —NH-(cycloalkyl), such as —NH-cyclohexyl, and the like.

The term "cycloalkylalkylamino" —NH-(alkyl)-(cycloalkyl), such as —NHCH$_2$— cyclohexyl, and the like.

It is noted in regard to all of the definitions provided herein that the definitions should be interpreted as being open ended in the sense that further substituents beyond those specified may be included. Hence, a C$_1$ alkyl indicates that there is one carbon atom but does not indicate what are the substituents on the carbon atom. Hence, a C$_1$ alkyl comprises methyl (i.e., —CH3) as well as —CR$_a$R$_b$R$_c$ where R$_a$, R$_b$, and R$_c$ can each independently be hydrogen or any other substituent where the atom alpha to the carbon is a heteroatom or cyano. Hence, CF$_3$, CH$_2$OH and CH$_2$CN are all C$_1$ alkyls.

Unless otherwise stated, structures depicted herein are meant to include compounds which differ only in the presence of one or more isotopically enriched atoms. For example, compounds having the present structure except for the replacement of a hydrogen atom by a deuterium or tritium, or the replacement of a carbon atom by a $^{13}$C- or $^{14}$C-enriched carbon are within the scope of the invention.

In various embodiments, compounds of the present invention as disclosed herein may be synthesized using any synthetic method available to one of skill in the art. Non-limiting examples of synthetic methods used to prepare various embodiments of compounds of the present invention are disclosed in the Examples section herein.

s-(FI)Ti(x)-(Cp*SiNR)Ti(y) and s-(FI)Ti(x)-s-(Cp*SiNR)Ti(y) are used interchangeably herein.

Production of linear low density polyethylene (LLDPE) by copolymerization of ethylene with an α-olefin is an important industrial process. ((a) Peacock, A. J., *Handbook of Polyethylene: Structure, Properties and Applications*. Marcel Dekker: New York, 2000; (b) Kissin, Y. V., *Alkene Polymerization Reactions with Transition Metal Catalysts*. Elsevier: Amsterdam, 2008, Chapter 4; (c) Nowlin, T. E., *Business and Technology of the Global Polyethylene Industry*. John Wiley & Sons: Hoboken, new Jersey, 2014, Chapter 2). As currently practiced, ethylene is catalytically oligomerized to the α-olefin, principally 1-hexene or 1-octene, which is isolated and copolymerized with ethylene in a separate reactor, using a different catalytic system. (Klosin, J.; Fontaine, P. P.; Figueroa, R., *Acc. Chem. Res.* 2015, 48, 2004-2016). Orthogonal tandem catalysis, (Lohr, T. L.; Marks, T. J., *Nature. Chem.* 2015, 7, 477-482) where two independent catalysts operate together to perform consecutive transformations in a single reactor, offers the potential for a more efficient and economical process; a supported version would be of particular interest. Supported catalysts are widely used industrially in polyolefin synthesis, as they favor highly uniform particle morphology and free-flowing product without undesired "fines" (small polyethylene particles) and/or sticky ethylene copolymers with high 1-alkene content that adhere to reactor components, thus allowing for easy product isolation and preventing reactor fouling. (Hlatky, G. G., *Chem. Rev.* 2000, 100, 1347-1376). Herein we report the first successful generation of a tandem LLDPE catalyst by co-supporting both trimerization and polymerization catalysts on the same silica particles.

We previously reported that the ethylene trimerization precatalyst initially developed by Fujita et al., (FI)TiCl$_3$ (FI=(N-(5-methyl-3-(1-adamantyl)-salicylidene)-2'-(2"-methoxyphenyl)anilinato) (Suzuki, Y.; Kinoshita, S.; Shibahara, A.; Ishii, S.; Kawamura, K.; Inoue, Y.; Fujita, T., *Organometallics* 2010, 29, 2394-2396) can be effectively used in a methylaluminoxane (MAO)/silica supported form, called s-(FI)Ti. (Sattler, A.; Aluthge, D. C.; Winkler, J. R.; Labinger, J. A.; Bercaw, J. E., *ACS Catalysis* 2016, 6, 19-22). In various embodiments of the present invention, a tandem catalyst with co-supported (Cp*SiNR)TiCl$_2$ (Cp*SiNR=($\eta^5$-C$_5$Me$_4$)Me$_2$Si($\eta^1$-NCMe$_3$), originally reported by Okuda et al. (Okuda, J., *Chem. Ber.* 1990, 123, 1649-1651) and Dow Chemical Company, (Stevens, J. C.; Timmers, F. J.; Schmidt, G., F.; Nicklas, P., N.; Rosen, R., K; Knight, G., W.; Lai, S.-y., 1991, EP416815A2), as the copolymerization component, was generated by addition of a solution of the two catalysts (e.g., (FI)TiCl$_3$ and (Cp*SiNR)TiCl$_2$) to a toluene slurry of MAO/silica (Scheme 1). Co-supported systems with y/x=1-10 were prepared in this manner. In all instances the Al:Ti ratio (300:1) and the total titanium loading (0.018 mmol/g of MAO/silica) were kept the same. The co-supported catalyst systems thus obtained are yellow free-flowing, pyrophoric solids, highly sensitive towards air and moisture.

Scheme 1. Preparation of co-cupported catalysts

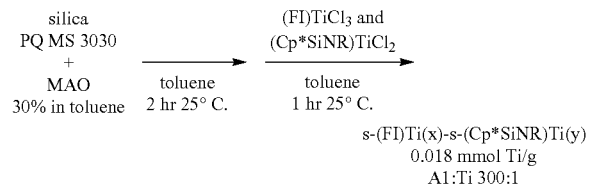

Figure 2:
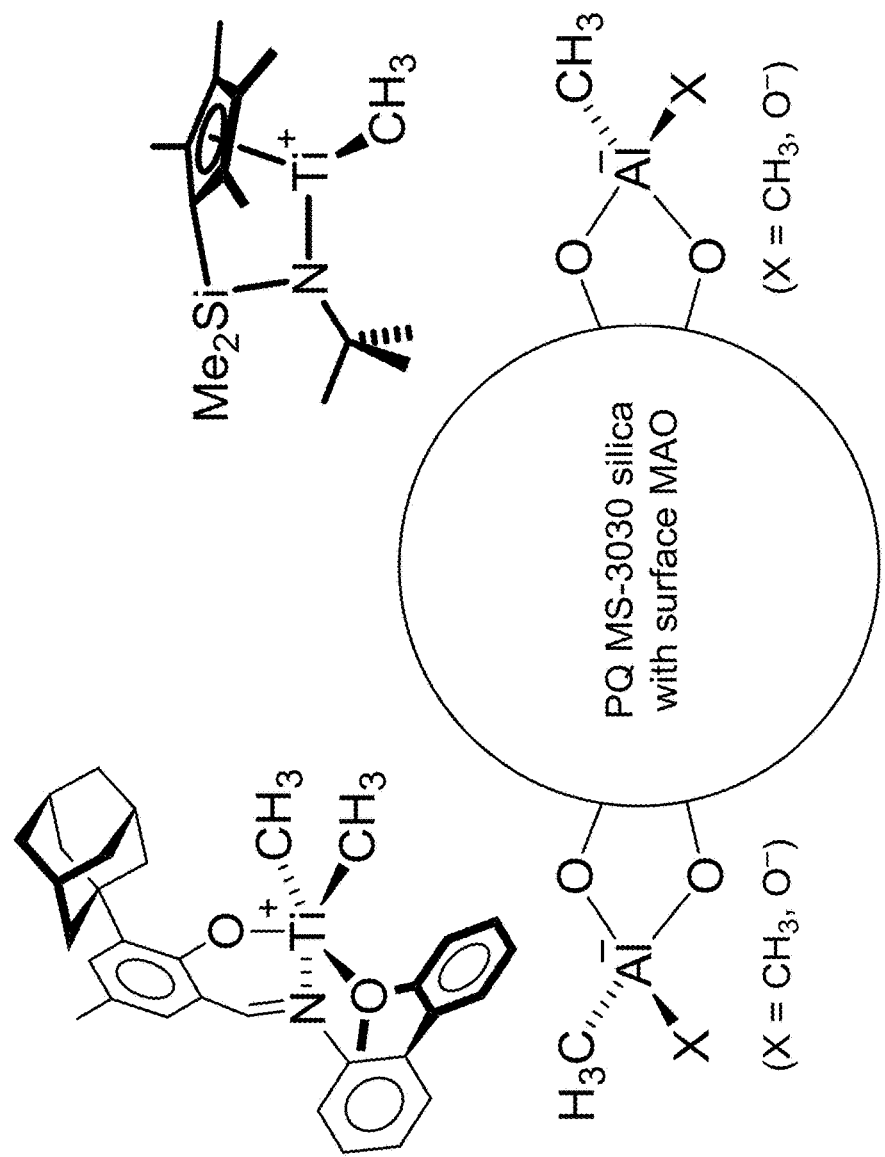
FIG. 2 depicts in accordance with various embodiments of the invention, a representation of cosupported s-(FI)Ti(x)-(Cp*SiNR)Ti(y) catalysts.

Without being bound by theory, the precatalysts are presumed to react with the silica-supported MAO via methylation and abstraction of methyl anions, giving cationic species that are bound to the particle surface via electrostatic interactions (FIG. 2). During polymerization, polymer formation is confined to the particles and the supernatant remains clear throughout, indicating no discernible catalyst leaching. To establish this with certainty, the co-supported catalyst was stirred in toluene for 3 hours, and the toluene supernatant was separated and treated with ethylene. No polymer was observed, nor was any 1-hexene detected in solution via gas chromatography.

Polymerization of ethylene was carried out using a high-vacuum line at 1 atmosphere, and in a reactor with a thick-walled glass vessel at elevated pressure. It should be noted that extremely thorough removal of moisture and oxygen from the ethylene, by passage through columns of activated manganese oxide (Shriver, D. F.; Drezdzon, M. A., *The Manipulation of Air-Sensitive Compounds*. Wiley-Interscience: New York, 1986; p 78-80) over vermiculite and 4 Å molecular sieves, is essential for proper functioning. The trimerization component appears to be especially sensitive, as observed in our previous work: (Sattler, A.; Aluthge, D. C.; Winkler, J. R.; Labinger, J. A.; Bercaw, J. E., *ACS Catalysis* 2016, 6, 19-22) even with purification, the catalyst with the lowest loading of the trimerization component, s-(FI)Ti(1)-(Cp*SiNR)Ti(10), generated only high density polyethylene and no detectable 1-hexene in the supernatant, indicating complete deactivation. The detrimental effect of impurities becomes especially pronounced with increasing ethylene pressure.

However, at higher (FI)Ti loadings (y/x≤5), s-(FI)Ti(x)-(Cp*SiNR)Ti(y) catalyzes formation of LLDPE from ethylene: catalysts with y/x=5, 4, 3 and 2 generated copolymers with 1-hexene incorporation of 1.2, 1.8, 7.0 and 16 mol % respectively, as determined by quantitative $^{13}$C{$^1$H} NMR spectroscopy (Brandolini, A. J.; Hills, D. D., *NMR Spectra of Polymers and Polymer Additives*. Marcel Dekker, Inc.: New York, 2000) (Table 1).

TABLE 1

Tandem trimerization and polymerization of ethylene with s-(FI)Ti(x)-(Cp*SiNR)Ti(y).

| Entry[a] | y/x[b] | Catalyst amount (mg) | Ethylene pressure (atm) | Polymer yield (g)[c] | 1-Hexene incorp. (%) |
|---|---|---|---|---|---|
| 1 | 1 | 554 | 1 | 5.46 | >50 |
| 2 | 2 | 620 | 1 | 10.1 | 20 |
| 3 | 2.6 | 598 | 1 | 6.66 | 16 |
| 4 | 3 | 590 | 1 | 11.1 | 7.0 |
| 5 | 4 | 597 | 1 | 3.81 | 1.8 |
| 6 | 5 | 599 | 1 | 5.57 | 1.2 |
| 7 | 10 | 550 | 1 | 6.84 | 0 |
| 8 | 3 | 305 | 1 | 3.41 | 7.6 |
| 9[d] | 3 | 74:226 | 1 | 4.23 | 10.7 |
| 10 | 3 | 304 | 4.4 | 8.95 | 20 |
| 11 | 5 | 607 | 4.4 | 8.01 | 3.8 |
| 12 | 3 | 590 | 1 | 0.72 | >50 |

[a]Entries 1-7 and 11 were carried out as a slurry with 100 mL of toluene; for entries 8, 9 and 10, 50 mL of toluene was used. Entry 12 is a solvent-free polymerization. All reactions were run for 3 hours.
[b]The total titanium content in the co-supported catalyst is 0.018 mmol/g.
[c]Total dry weight of isolated solid corrected for the weight of supported catalyst.
[d]Separately supported s-FI(Ti) and s-(Cp*SiNR)Ti were used as a mixed-solid slurry.

As the 1-hexene content increases above 1 mol %, the morphology of the polymer changes from a dry, free-flowing granular material to become less granular and more soluble in 1,1,2,2-tetrachloroethane; the material becomes sticky and rubbery above 10 mol %. Polymers containing >50 mol % 1-hexene are rubber-like elastomers. Yields vary noticeably, even for the same batch of catalyst under very similar polymerization conditions. Such variable yields are not unexpected for a heterogeneous system, where mass transfer effects can become pronounced as the catalyst becomes coated with LLDPE; variation in ethylene purity may also be a contributing factor.

The solvent-free reaction (entry 12, Table 1) results in a small amount of highly hexene-rich polymer, as might be expected: once trimerization has begun, the catalyst is essentially suspended in pure 1-hexene.

Comparison of entries 8 and 9 in Table 1 shows that LLDPE produced from separately supported s-(FI)Ti and s-(Cp*SiNR)Ti incorporates more 1-hexene than that from the co-supported catalyst with the same s-(FI)Ti:s-(Cp*SiNR)Ti ratio (1:3), suggesting that some (FI)Ti is decomposed during the co-supporting procedure. This partial decomposition may also contribute to the lack of 1-hexene formation and only HDPE formation at the lowest s-(FI)Ti loadings (vide supra).

Increasing the ethylene pressure results in both higher polymer yields and more incorporation of 1-hexene (compare entries 10 vs 8 and 11 vs 6, Table 1). The latter trend is undoubtedly a consequence of the different rate dependencies on ethylene concentration of the two catalysts: trimerization over FI(Ti) is second order, (Suzuki, Y.; Kinoshita, S.; Shibahara, A.; Ishii, S.; Kawamura, K.; Inoue, Y.; Fujita, T., *Organometallics* 2010, 29, 2394-2396) while polymerization over (Cp*SiNR)Ti is first order. (Mehdiabadi, S.; Soares, J. B. P., *Macromolecules* 2012, 45, 1777-1791; The order with respect to ethylene with this catalyst (at elevated temperature, 120° C.) was reported to be pressure-dependent, changing from 2nd order at low pressures to 1st order at higher pressures). Control of the LLDPE composition by simply changing ethylene pressure is an interesting and potentially useful feature of our tandem catalyst system.

Figure 3:
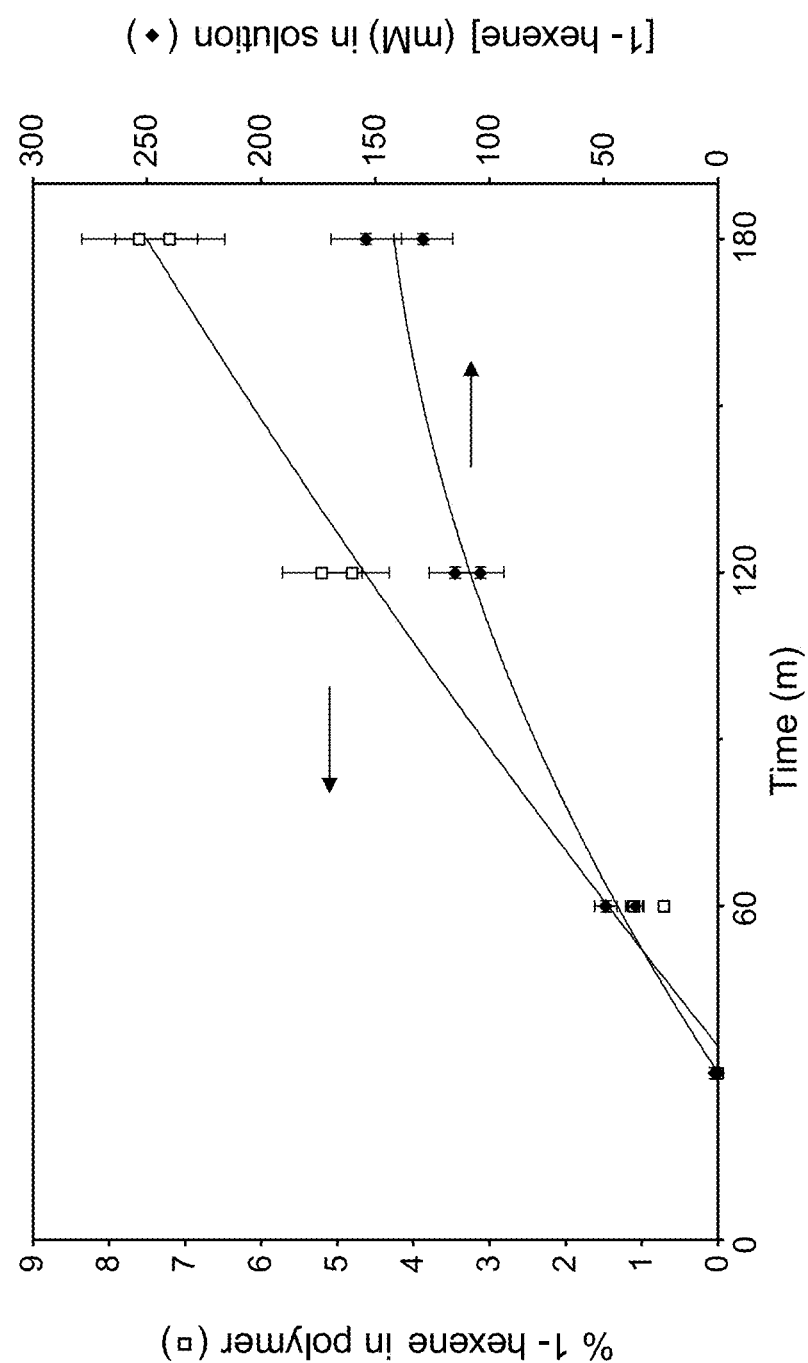
FIG. 3 depicts in accordance with various embodiments of the invention, a plot of 1-hexene in solution and in polymer vs. time with s-(FI)Ti(1)-(Cp*SiNR)Ti(3) at 1 atm of ethylene pressure.

In order to investigate the behavior of the co-supported catalyst during the course of the reaction, polymerizations at 30 min, 1 h, 2 h, and 3 h intervals were carried out, and the 1-hexene content in solution and in the LLDPE were determined. As shown in FIG. 3 more 1-hexene is incorporated into the polymer and is present in solution with time. Moreover, an induction period for the trimerization catalyst is indicated, consistent with previous studies on s-(FI)Ti. (Sattler, A.; Aluthge, D. C.; Winkler, J. R.; Labinger, J. A.; Bercaw, J. E., *ACS Catalysis* 2016, 6, 19-22). That implies the co-supported catalyst initially produces HDPE; as the run proceeds, 1-hexene concentration builds, and LLDPE is generated with increasing amounts of 1-hexene incorporation. That would lead either to a tapered microstructure with high ethylene content at one terminus with more and more 1-hexene incorporated further along the chain, or to a mixture of low- and high-1-hexene incorporated chains, depending on the average lifetime of individual growing chains compared to the length of the run. Thus, these should be unusual polymers, in that they are blends of HDPE and LLDPEs having a range of 1-hexene incorporated. (Of course, the $^{13}$C NMR determined values represent the average 1-hexene incorporation over the mixture.)

Several experiments, along with kinetic modeling, were carried out to investigate whether the catalysts operate independently or interact with one another. A mechanism consisting of three basic steps—insertion of ethylene into a polymer chain growing on the (Cp*SiNR)Ti center; insertion of 1-hexene into the same chain; and trimerization of ethylene at the (FI)Ti center—was modelled using a simple BASIC program. (See Examples section herein). Rate constants for the first two steps were calculated from experiments on the supported (Cp*SiNR)Ti catalyst alone, with pure ethylene and ethylene plus added 1-hexene as substrates, respectively. A rate constant for the trimerization step was then estimated by fitting predictions to the results for the tandem catalyst.

Simulations carried out using this model correlate reasonably well (given the approximations involved, discussed in the Examples section herein) with experimental data, as shown in Table 2.

TABLE 2

Calculated vs. observed performance for reactions over s-(FI)Ti(1)-(Cp*SiNR)Ti(3).

| | time of run, h | Polymer yield, g | Mol % 1-hexene in polymer | [1-hexene] in solution, mM | % label in polymer | % label in free 1-hexene |
|---|---|---|---|---|---|---|
| Experimental[a] | 3 | 3.21 | 7.6 | 129 | — | — |
| Model[a] | 3 | 3.20 | 7.5 | 146 | — | — |
| Experimental[b] | 1 | 1.53 | 4.1 | 59 | 50 | 18 |
| Model[b] | 1 | 0.96 | 5.6 | 78 | 47 | 29 |
| Coop. Model[b,c] | 1 | 1.14 | 8.6 | 50 | 25 | 40 |
| Experimental[b] | 2 | 2.31 | 7.5 | 105 | 31 | <5 |
| Model[b] | 2 | 1.93 | 8.5 | 120 | 29 | 13 |
| Coop. Model[b,c] | 2 | 2.26 | 10.2 | 80 | 20 | 21 |

[a]1 atm C$_2$H$_4$, no added 1-hexene.
[b]1 atm C$_2$H$_4$ + 50 mM $^{13}$CH$_2$=CHC$_4$H$_9$.
[c]Assumes 50% of 1-hexene generated by trimerization is directly incorporated into polymer without leaving surface of supported catalyst. (See Examples section herein).

Two points are particularly noteworthy. First, the best-fit rate constant for trimerization is less than half that determined for trimerization by the s(FI)Ti alone, (Sattler, A.; Aluthge, D. C.; Winkler, J. R.; Labinger, J. A.; Bercaw, J. E., *ACS Catalysis* 2016, 6, 19-22) suggesting that the (FI)Ti catalyst is somewhat inactivated in the presence of the (Cp*SiNR)Ti catalyst—but not the other way around, consistent with the greater sensitivity of the former. Second, there does not appear to be any significant degree of cooperativity—that is, essentially all of the 1-hexene generated at (FI)Ti goes into solution rather than being directly transferred to a nearby growing chain. The fact that the data can be well modeled without including any such process suggests that, but not definitively. Stronger support for this conclusion is provided by additional observations:

1. Incorporation of 1-hexene into polymer increases with time, in parallel with increasing concentration of 1-hexene in solution (FIG. 3). If 1-hexene primarily went directly from one catalyst center to another without leaving the support, the level of incorporation should be more nearly constant over time, as was observed for the covalently-linked system mentioned above. (Liu, S.; Motta, A.; Delferro, M.; Marks, T. J., *J. Am. Chem. Soc.* 2013, 135, 8830-8833).

2. When the tandem catalysis is performed with a mixture of separately supported (FI)TiCl$_3$ (s-(FI)Ti) and (Cp*SiNR)TiCl$_2$ (s-(Cp*SiNR)Ti), at the same catalyst ratios and loadings, higher 1-hexene incorporation is observed compared to its co-supported form (Table 1, entries 8 and 9). That is consistent with the partial deactivation of the trimerization catalyst deduced above; the opposite behavior would be expected for the cooperative situation.

Figure 4:
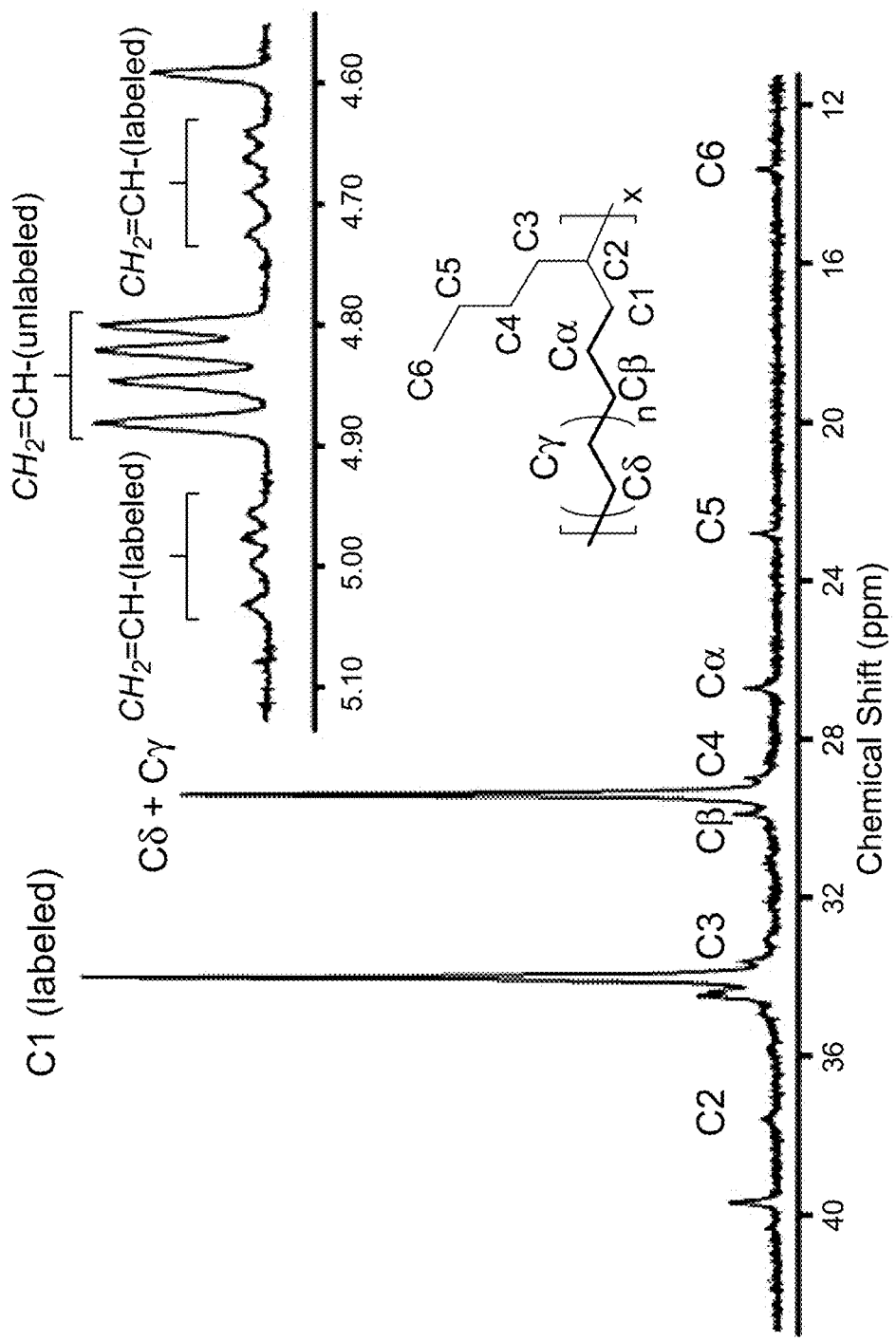
FIG. 4 depicts in accordance with various embodiments of the invention, $^{13}C$ NMR of polymer sample generated with s-(FI)Ti(1)-(Cp*SiNR)Ti(3) with added $^{13}C$ labeled 1-hexene. Inset: $^1H$ NMR of solution for this reaction with remaining labeled and unlabeled 1-hexene.

3. Experiments were performed with added 1-$^{13}$C-labeled 1-hexene; the percentage of labeled 1-hexene, both in the polymer and the solution, was determined after two reaction times by $^{13}$C and R$^1$H NMR spectroscopy (FIG. 4), and compared to predictions using the kinetic model (Table 2). The key observation is that the label content of the polymer is higher than that in solution from the earliest stages; the opposite would be true for a significant contribution of cooperative behavior. The combination of these three findings shows clearly that practically all of the 1-hexene generated goes into solution prior to polymerization.

Finally we evaluated polymer properties of our polymer samples for comparison to those for previously reported LLDPE. Gel permeation chromatography (GPC) of selected LLDPE samples showed material with M$_n$ values between 200-450 kDa and narrow polydispersity (~2-3). (See Examples section herein). Differential scanning calorimetry (DSC) shows that the LLDPE samples have lower melting points than HDPE produced using s-(Cp*SiNR)Ti alone; the melting temperature decreases and the DSC peaks broaden with increasing 1-hexene content, consistent with decreasing crystallinity of the material. (See Examples section herein). CRYSTAF data indicates a complex chemical composition distribution, again as expected with LLDPE. (Karbashewski, E.; Kale, L.; Rudin, A.; Tchir, W. J.; Cook, D. G.; Pronovost, J. O., *J. Appl. Polym. Sci.* 1992, 44, 425-434).

In conclusion, the co-supported s-(FI)Ti(x)-(Cp*SiNR)Ti (y) system leads to competent catalysts for the tandem trimerization and polymerization of ethylene to generate LLDPE. This successful co-immobilization of a tandem catalyst system is an important step towards establishing the potential utility of such systems.

Trimerization Precatalysts in various embodiments of the present invention a trimerization precatalyst is a metal coordination complex of Formula I:

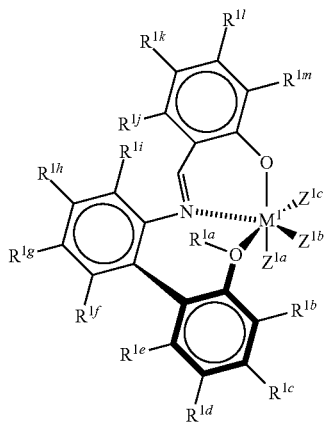

wherein,

M¹ is Ti, Zr, or Hf;

$Z^{1a}$, $Z^{1b}$, and $Z^{1c}$ are independently hydrogen or an optionally substituted substituent;

$R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl;

$R^{1b}$, $R^{1c}$, $R^{1d}$, and $R^{1e}$ are independently hydrogen or an optionally substituted substituent;

$R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent.

In some embodiments of the present invention a trimerization precatalyst is a metal coordination complex of Formula I having the structure:

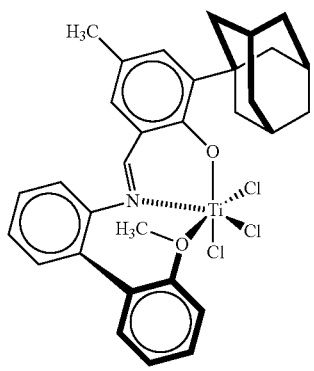

Metal coordination complexes of Formula I are generally known as precatalysts, more specifically trimerization precatalysts or trimerization precatalyst compounds. Active trimerization catalysts are prepared from the metal coordination complexes of Formula I by combining or contacting the metal coordination complexes of Formula I with one or more activators or activated solid supports.

Polymerization Precatalyts

In various embodiments of the present invention a polymerization precatalyst is a metal coordination complex of Formula II:

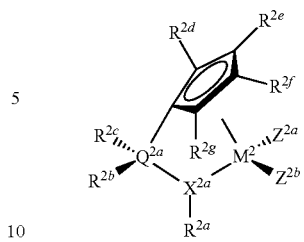

wherein,

M² is Ti, Zr, or Hf;

$Z^{2a}$ and $Z^{2b}$ are independently hydrogen or an optionally substituted substituent;

$X^{2a}$ is O or N;

$Q^{2a}$ is C or Si;

$R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N;

$R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent.

In some embodiments of the present invention a polymerization precatalyst is a metal coordination complex of Formula II having the structure:

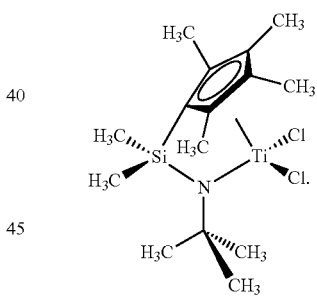

Metal coordination complexes of Formula II are generally known as precatalysts, more specifically polymerization precatalysts or polymer precatalyst compounds. Active polymerization catalysts are prepared from the metal coordination complexes of Formula II by combining or contacting the metal coordination complexes of Formula II with one or more activators or activated solid supports. In the metal coordination complexes of Formula II, the cyclopentadienyl ring (Cp) (e.g., $C_5R^{2d}R^{2e}R^{2f}R^{2g}$ group) is bound in an $\eta^5$ bonding mode to M².

Trimerization Catalysts

In various embodiments of the present invention a trimerization catalyst is a cationic metal coordination complex of Formula Ia:

29

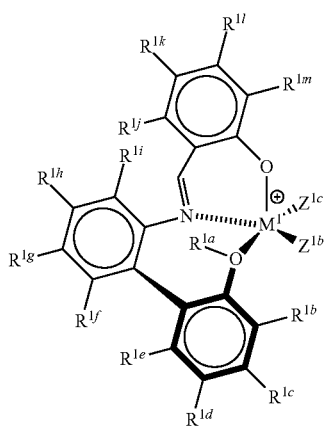

(Formula Ia)

wherein, $M^1$ is Ti, Zr, or Hf;

$Z^{1b}$ and $Z^{1c}$ are independently hydrogen or an optionally substituted substituent;

$R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl;

$R^{1b}$, $R^{1c}$, $R^{1d}$, and $R^{1e}$ are independently hydrogen or an optionally substituted substituent;

$R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent.

In some embodiments of the present invention a trimerization catalyst is a cationic metal coordination complex of Formula Ia having the structure:

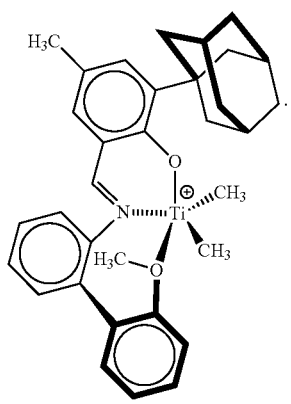

In various embodiments of the present invention a trimerization catalyst is prepared by obtaining a trimerization precatalyst (e.g., a metal coordination complex of Formula I), contacting the trimerization precatalyst with an activator or an activated solid support under conditions effective to form the trimerization catalyst. Without being bound by theory the trimerization precatalyst is hypothesized to react with the activator (e.g., methylaluminoxane) or activated solid support (e.g., silica supported methylaluminoxane) via alkylation (e.g., methylation) and abstraction of alkyl anions (e.g., methyl anions) to give the trimerization catalysts (e.g., cationic metal coordination complex of Formula Ia) (FIG. 2).

30

Polymerization Catalysts

In various embodiments of the present invention a polymerization catalyst is a cationic metal coordination complex of Formula IIa:

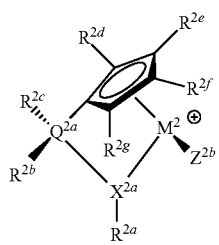

(Formula IIa)

wherein, $M^2$ is Ti, Zr, or Hf;

$Z^{2b}$ is hydrogen or an optionally substituted substituent;

$X^{2a}$ is O or N;

$Q^{2a}$ is C or Si;

$R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N;

$R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent.

In some embodiments of the present invention a polymerization catalyst is a cationic metal coordination complex of Formula IIa having the structure:

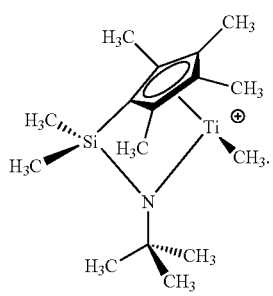

In various embodiments of the present invention a polymerization catalyst is prepared by obtaining a polymerization precatalyst (e.g., a metal coordination complex of Formula II), contacting the polymerization precatalyst with an activator or an activated solid support under conditions effective to form the polymerization catalyst. Without being bound by theory the polymerization precatalyst is hypothesized to react with the activator (e.g., methylaluminoxane) or activated solid support (e.g., silica supported methylaluminoxane) via alkylation (e.g., methylation) and abstraction of alkyl anions (e.g., methyl anions) to give the polymerization catalysts (e.g., cationic metal coordination complex of Formula IIa).

Activators

The term activator or activators as used herein refers to a secondary component of the catalysts able to cause the trimerization precatalysts and the polymerization precatalysts to become active trimerization catalysts and polymerization catalysts for the production or synthesis of LLDPE. Non-limiting examples of activators for use herein include aluminum compounds containing an Al—O bond such as organoaluminoxanes or aluminoxanes. In some embodiments the activator is an organoaluminoxane. In some embodiments the organoaluminoxane is an alkylaluminoxane. In some embodiments the alkylaluminoxane is methylaluminoxane (MAO). In some embodiments the organoaluminoxanes or aluminoxanes may optionally comprise an alkyl aluminum compound. Non-limiting examples of alkyl aluminum compounds include compounds corresponding to the formula: $AlR_n X''_{3-n}$, wherein R in each occurrence is alkyl or aralkyl, $X''$ is halogen, and n is 1, 2, or 3. In some embodiments alkyl aluminum compounds are trialkylaluminum compounds (e.g., trimethylaluminum, triethylaluminum, etc.). Activators may also be referred to as activating cocatalysts. In some embodiments the activator is methylaluminoxane (MAO).

In some embodiments the activator is suspended in a solvent or carrier. In some embodiments the activator is dissolved in a solvent or carrier. In some embodiments, the activator is an activator solution, wherein the activator solution comprises a solvent or carrier; and an activator. Non-limiting examples of suitable solvents or carriers include liquid aliphatic hydrocarbons such as isobutane, butane, pentane, hexane, heptane, octane or liquid paraffin, aromatic hydrocarbons such as benzene, toluene or xylene, alicyclic hydrocarbons such as cyclohexane. These solvents may be used either alone or in admixtures or combinations with each other. In some embodiments the solvent is toluene.

Solid Supports

The trimerization precatalyst and polymerization precatalyst may be supported on a solid support, in combination with an appropriate activator, in order to obtain the supported catalyst systems of the present invention. Non-limiting examples of solid supports include silicas, aluminas, clays, zeolites, magnesium chloride, and polymeric supports such as polystyrenes, substituted polystyrenes and the like. Polymeric supports may be cross-linked or not.

In some embodiments the solid support is selected from silica, alumina, silica-alumina, zeolites, clays, mica, talc, magnesia, titania, zirconia, magnesium dichloride-alcohol adduct, or combinations thereof. In some embodiments the solid support is silica. In some embodiments the solid support is a particulate solid support. In some embodiments the solid support is free-flowing. In some embodiments the solid support is disintegrable. In some embodiments the solid support is a particulate solid support, wherein the particulate solid support is free-flowing and disintegrable. In some embodiments the solid support is silica.

Activated Solid Supports

In various embodiments an activated solid support comprises an activator attached to a solid support. In various embodiments an activated solid support comprises an activator and a solid support, wherein the activator is attached to the solid support. In various embodiments, an activated solid support is prepared by obtaining a solid support, and contacting the solid support with an activator. In various embodiments, an activated solid support is prepared by obtaining a solid support, and contacting the solid support with an activator under conditions effective to attach the activator to the solid support. In various embodiments the preparation of the activated solid support may be performed in the absence or presence of a solvent. In various embodiments the attachment of the activator to the solid support may be by a covalent bond, non-covalent bond, electrostatic bond, electrostatic interaction, or coordinative bond. Non-covalent interactions include, for example, ionic, hydrogen bonding, van der Waals, or some combination thereof. In some embodiments, the activator is attached to the surface of the solid support. In various embodiments, the activated solid support comprises one or more negative charges following a reaction with a trimerization precatalyst and/or polymerization precatalyst as described herein (e.g., the precatalysts are presumed to react with the silica-supported MAO via methylation and abstraction of methyl anions, giving cationic species that are bound to the particle surface via electrostatic interactions (FIG. 2)). In various embodiments, an activated solid support comprises a solid support and an activator, wherein the activator is attached to a surface of the solid support. In various embodiments an activated solid support comprises a solid support and an activator, wherein the activator is attached to a surface of the solid support, where the attached activator comprises a negative charge following a reaction with a trimerization precatalyst and/or polymerization precatalyst as described herein (e.g., the precatalysts are presumed to react with the silica-supported MAO via methylation and abstraction of methyl anions, giving cationic species that are bound to the particle surface via electrostatic interactions (FIG. 2)).

Non-limiting examples of activated solid supports include silicas, aluminas, clays, zeolites, magnesium chloride, and polymeric supports such as polystyrenes, substituted polystyrenes and the like, comprising an activator attached to the solid support. Polymeric supports may be cross-linked or not. For non-limiting examples of solid supports see Hlalky, *Chem. Rev.* 2000, 100, 1347-1376 and Fink et al., *Chem. Rev.* 2000, 100, 1377-1390, both of which are incorporated herein by reference. In some embodiments the activated solid support is selected from silica, alumina, silica-alumina, zeolites, clays, mica, talc, magnesia, titania, zirconia, magnesium dichloride-alcohol adduct, or combinations thereof, comprising an activator attached to the solid support. In some embodiments the activated solid support comprises silica and methylaluminoxane, wherein the methylaluminoxane is attached to the silica. In some embodiments the activated solid support is a particulate activated solid support. In some embodiments the activated solid support is free-flowing. In some embodiments the activated solid support is disintegrable. In some embodiments the activated solid support is a particulate activated solid support, wherein the particulate activated solid support is free-flowing and disintegrable.

Supported Catalyst Systems

In various embodiments, the present invention provides a supported catalyst system, comprising:

a. a trimerization catalyst, wherein the trimerization catalyst is a cationic metal coordination complex of Formula Ia:

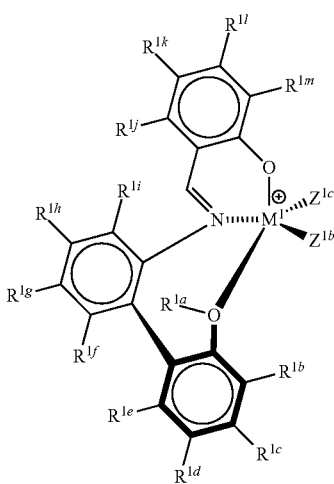

(Formula Ia)

wherein, $M^1$ is Ti, Zr, or Hf;

$Z^{1b}$ and $Z^{1c}$ are independently hydrogen or an optionally substituted substituent;

$R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl;

$R^{1b}$, $R^{1c}$, $R^{1d}$, and $R^{1e}$ are independently hydrogen or an optionally substituted substituent;

$R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent;

b. a polymerization catalyst, wherein the polymerization catalyst is a cationic metal coordination complex of Formula IIa:

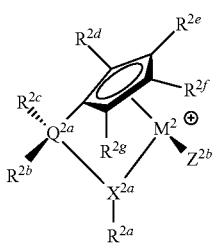

(Formula IIa)

wherein, $M^2$ is Ti, Zr, or Hf;

$Z^{2b}$ is hydrogen or an optionally substituted substituent;

$X^{2a}$ is O or N;

$Q^{2a}$ is C or Si;

$R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N;

$R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent; and c. an activated solid support, wherein the trimerization catalyst and the polymerization catalyst are attached to the activated solid support.

In various embodiments of the supported catalyst systems of the invention, the activated solid support comprises one or more negative charges. In some embodiments of the supported catalyst systems of the invention, the attachment of the trimerization catalyst and the polymerization catalyst to the activated solid support is by an electrostatic bond between the catalysts and the activated solid support. In some embodiments of the supported catalyst systems of the invention, the trimerization catalyst and the polymerization catalyst are independently bound to the activated solid support by electrostatic interaction with the activated solid support. In some embodiments of the supported catalyst systems of the invention, the attachment of the trimerization catalyst and the polymerization catalyst to the activated solid support may be by a covalent bond, non-covalent bond, electrostatic bond, electrostatic interaction, or coordinative bond. Non-covalent interactions include, for example, ionic, hydrogen bonding, van der Waals, or some combination thereof. In some embodiments of the supported catalyst systems of the invention, the attachment of the trimerization catalyst and the polymerization catalyst to the activated solid support is by an electrostatic bond between the catalysts and the activated solid support. In some embodiments of the supported catalyst systems of the invention, the attachment of the trimerization catalyst and the polymerization catalyst to the activated solid support is between the catalysts and the activator attached to the activated solid support. In some embodiments of the supported catalyst systems of the invention, the attachment of the trimerization catalyst and the polymerization catalyst to the activated solid support is by an electrostatic bond between the catalysts and the activator attached to a surface of the activated solid support. In some embodiments of the supported catalyst systems of the invention, the attachment of the trimerization catalyst to the activated solid support is by an electrostatic bond between the trimerization catalyst and the activated solid support. In some embodiments of the supported catalyst systems of the invention, the attachment of the polymerization catalyst to the activated solid support is by an electrostatic bond between the polymerization catalyst and the activated solid support. In some embodiments, the trimerization catalyst and the polymerization catalyst are attached to the same activated solid support. In some embodiments, the activated solid support comprises one or more members, wherein the trimerization catalyst and the polymerization catalyst are attached to one or more of the same members. In some embodiments, the activated solid support is a particulate activated solid support comprising a plurality of particles, and the trimerization catalyst and the polymerization catalyst are attached to a same particle. In some embodiments, the activated solid support comprises one or more particles, wherein the trimerization catalyst and the polymerization catalyst are attached to one or more of the same particles. In some embodiments, the trimerization catalyst and the polymerization catalyst are both co-supported on the same activated solid support.

In various embodiments of the supported catalyst systems of the invention, $Z^{1b}$ and $Z^{1c}$ are independently selected from alkyl and substituted alkyl; $Z^{2b}$ is selected from alkyl and substituted alkyl; and $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl. In some embodiments of the supported catalyst systems of the invention, $M^1$ is Ti; $Z^{1b}$ is methyl; $Z^{1c}$ is methyl; $M^2$ is Ti; and $Z^{2b}$ is methyl. In some embodiments, of the supported catalyst systems of the invention, the cationic metal coordination complex of Formula Ia is:

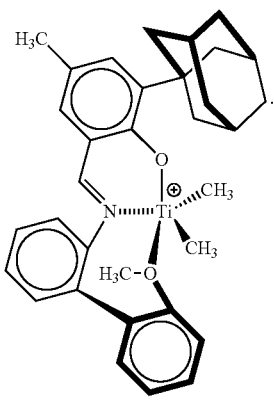

In some embodiments of the supported catalyst systems of the invention, the cationic metal coordination complex of Formula IIa is:

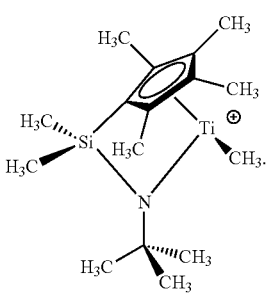

In some embodiments of the supported catalyst systems of the invention, the cationic metal coordination complex of Formula Ia is:

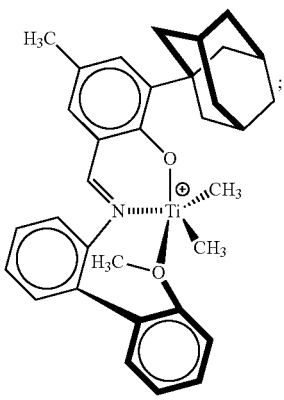

and the cationic metal coordination complex of Formula IIa is:

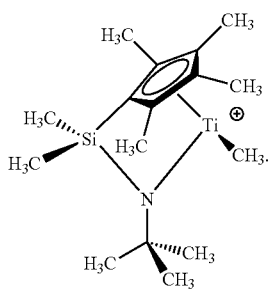

In various embodiments of the supported catalyst systems of the invention, the activated solid support comprises an activator and a solid support, wherein the activator is attached to the solid support. In some embodiments, the activator is an aluminum compound. In some embodiments, the aluminum compound is an organoaluminoxane. In some embodiments, the organoaluminoxane is an alkylaluminoxane. In some embodiments, the alkylaluminoxane is methylaluminoxane. In some embodiments, the solid support comprises an inorganic material, an organic material, or a combination thereof. In some embodiments, the inorganic material is selected from silica, alumina, silica-alumina, zeolites, clays, mica, talc, magnesia, titania, zirconia, magnesium dichloride-alcohol adduct, or combinations thereof. In some embodiments, the inorganic material is silica. In some embodiments the solid support is selected from silica, alumina, silica-alumina, zeolites, clays, mica, talc, magnesia, titania, zirconia, magnesium dichloride-alcohol adduct, or combinations thereof. In some embodiments, the solid support is silica. In some embodiments, the activated solid support is a particulate activated solid support. In some embodiments, the particulate activated solid support is free-flowing and disintegrable. In some embodiments, the activated solid support comprises methylaluminoxane and silica, wherein the methylaluminoxane is attached to the silica.

In various embodiments of the supported catalyst systems of the invention, the supported catalyst system is in the form of a slurry. In some embodiments the slurry comprises an optional solvent. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments the optional solvent is toluene.

In various embodiments the supported catalyst systems of the present invention may be used as a slurry or in slurry polymerization to generate the LLDPE polymer. The slurry or slurry polymerization may be in the absence or presence of a solvent. Non-limiting examples of suitable solvents include liquid aliphatic hydrocarbons such as isobutane, butane, pentane, hexane, heptane, octane or liquid paraffin, aromatic hydrocarbons such as benzene, toluene or xylene, alicyclic hydrocarbons such as cyclohexane. These solvents may be used either alone or in admixtures or combinations with each other. In some embodiments the solvent used in the slurry or in the slurry polymerization is toluene.

In various embodiments of the supported catalyst systems of the invention, the supported catalyst system comprises an optional solvent. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments the optional solvent is toluene.

In various embodiments the supported catalyst systems of this invention may be combined with other catalysts in a single reactor and/or employed in a series of reactors (parallel or serial) in order to form blends of polymer products.

In various embodiments of the supported catalyst systems of the invention, a ratio of the polymerization catalyst to the trimerization catalyst is from about 9:1 to about 1:1. In some embodiments of the supported catalyst systems of the invention, a ratio of the polymerization catalyst to the trimerization catalyst is 9:1, 8.9:1, 8.8:1, 8.7:1, 8.6:1, 8.5:1, 8.4:1, 8.3:1, 8.2:1, 8.1:1, 8.0:1, 7.9:1, 7.8:1, 7.7:1, 7.6:1, 7.5:1, 7.4:1, 7.3:1, 7.2:1, 7.1:1, 7.0:1, 6.9:1, 6.8:1, 6.7:1, 6.6:1, 6.5:1, 6.4:1, 6.3:1, 6.2:1, 6.1:1, 6.0:1, 5.9:1, 5.8:1, 5.7:1, 5.6:1, 5.5:1, 5.4:1, 5.3:1, 5.2:1, 5.1:1, 5.0:1, 4.9:1, 4.8:1, 4.7:1, 4.6:1, 4.5:1, 4.4:1, 4.3:1, 4.2:1, 4.1:1, 4.0:1, 3.9:1, 3.8:1, 3.7:1, 3.6:1, 3.5:1, 3.4:1, 3.3:1, 3.2:1, 3.1:1, 3.0:1, 2.9:1, 2.8:1, 2.7:1, 2.6:1, 2.5:1, 2.4:1, 2.3:1, 2.2:1, 2.1:1, 2.0:1, 1.9:1, 1.8:1, 1.7:1, 1.6:1, 1.5:1, 1.4:1, 1.3:1, 1.2:1, 1.1:1, or 1:1.

Methods to Prepare Supported Catalyst Systems

In various embodiments, the invention provides a method to prepare a supported catalyst system, comprising:
a. obtaining a solid support;
b. contacting the solid support with an activator to obtain an activated solid support; and
c. contacting the activated solid support with a precatalyst mixture, wherein the precatalyst mixture comprises a trimerization precatalyst, a polymerization precatalyst, and an optional solvent, wherein the trimerization precatalyst is a metal coordination complex of Formula I:

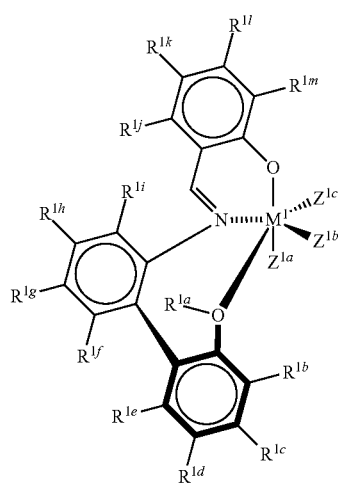

(Formula I)

wherein, $M^1$ is Ti, Zr, or Hf;

$Z^{1a}$, $Z^{1b}$, and $Z^{1c}$ are independently hydrogen or an optionally substituted substituent;

$R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl;

$R^{1b}$, $R^{1c}$, $R^{1d}$, and $R^{1e}$ are independently hydrogen or an optionally substituted substituent;

$R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent; and the polymerization precatalyst is a metal coordination complex of Formula II:

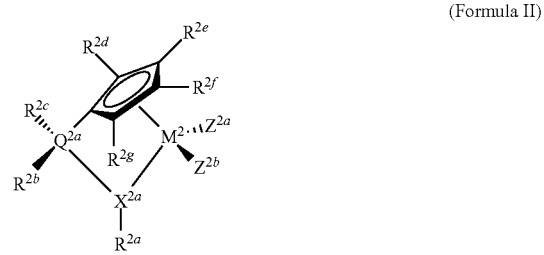

(Formula II)

wherein, $M^2$ is Ti, Zr, or Hf;

$Z^{2a}$ and $Z^{2b}$ are independently hydrogen or an optionally substituted substituent;

$X^{2a}$ is O or N;

$Q^{2a}$ is C or Si;

$R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N;

$R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent.

In some embodiments of a method to prepare a supported catalyst system of the invention the contacting the activated solid support with the precatalyst mixture is performed under conditions effective to prepare the supported catalyst system. In some embodiments of a method to prepare a supported catalyst system of the invention, $Z^{1a}$ $Z^{1b}$ and $Z^{1c}$ are independently selected from halogen, alkyl, and substituted alkyl; $Z^{2a}$ and $Z^{2b}$ are independently selected from halogen, alkyl, and substituted alkyl; and $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl. In some embodiments $M^1$ is Ti; and $M^2$ is Ti. In some embodiments, the metal coordination complex of Formula I is:

In some embodiments, the metal coordination complex of Formula II is:

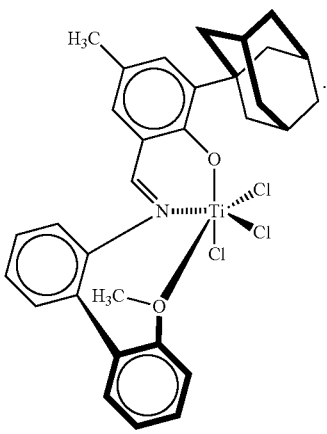

In some embodiments, the metal coordination complex of Formula I is:

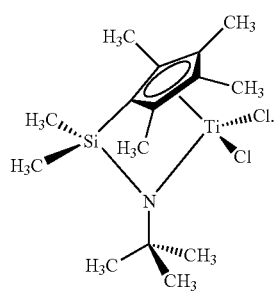

and the metal coordination complex of Formula II is:

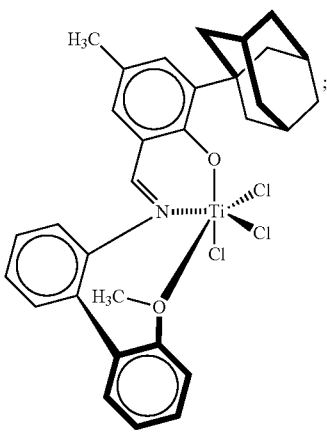

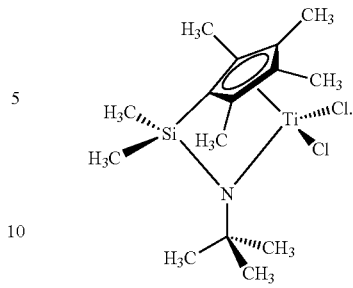

In some embodiments of a method to prepare a supported catalyst system of the invention, the activator comprises an aluminum compound. In some embodiments, the aluminum compound is an organoaluminoxane. In some embodiments, the organoaluminoxane is an alkylaluminoxane. In some embodiments, the alkylaluminoxane is methylaluminoxane. In some embodiments, the activator is methylaluminoxane. In some embodiments, the solid support comprises an inorganic material, an organic material, or a combination thereof. In some embodiments, the inorganic material is selected from silica, alumina, silica-alumina, zeolites, clays, mica, talc, magnesia, titania, zirconia, magnesium dichloride-alcohol adduct, or combinations thereof. In some embodiments, the inorganic material is silica. In some embodiments the solid support is silica. In some embodiments, the solid support is a particulate solid support. In some embodiments, the solid support is free-flowing and disintegrable. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments, the optional solvent is toluene. In various embodiments, the trimerization precatalyst and the polymerization precatalyst may be contacted with an activator before the activator is contacted with the solid support or after the activator is contacted with the solid support. In various embodiments, the solid support may be contacted with the activator prior to contact with the trimerization precatalyst and the polymerization precatalyst.

In various embodiments of a method to prepare a supported catalyst system of the invention a ratio of the polymerization precatalyst to the trimerization precatalyst is from about 9:1 to about 1:1. In some embodiments a ratio of the polymerization precatalyst to the trimerization precatalyst is 9:1, 8.9:1, 8.8:1, 8.7:1, 8.6:1, 8.5:1, 8.4:1, 8.3:1, 8.2:1, 8.1:1, 8.0:1, 7.9:1, 7.8:1, 7.7:1, 7.6:1, 7.5:1, 7.4:1, 7.3:1, 7.2:1, 7.1:1, 7.0:1, 6.9:1, 6.8:1, 6.7:1, 6.6:1, 6.5:1, 6.4:1, 6.3:1, 6.2:1, 6.1:1, 6.0:1, 5.9:1, 5.8:1, 5.7:1, 5.6:1, 5.5:1, 5.4:1, 5.3:1, 5.2:1, 5.1:1, 5.0:1, 4.9:1, 4.8:1, 4.7:1, 4.6:1, 4.5:1, 4.4:1, 4.3:1, 4.2:1, 4.1:1, 4.0:1, 3.9:1, 3.8:1, 3.7:1, 3.6:1, 3.5:1, 3.4:1, 3.3:1, 3.2:1, 3.1:1, 3.0:1, 2.9:1, 2.8:1, 2.7:1, 2.6:1, 2.5:1, 2.4:1, 2.3:1, 2.2:1, 2.1:1, 2.0:1, 1.9:1, 1.8:1, 1.7:1, 1.6:1, 1.5:1, 1.4:1, 1.3:1, 1.2:1, 1.1:1, or 1:1.

Methods for the Preparation of Linear Low Density Polyethylene (LLDPE)

In various embodiments the invention provides a method for the preparation of a linear low density polyethylene (LLDPE) polymer, comprising: providing a supported catalyst system; and contacting the supported catalyst system with ethylene under conditions effective to promote the tandem trimerization and polymerization of ethylene to form the linear low density polyethylene polymer, wherein the supported catalyst system, comprises:

a. a trimerization catalyst, wherein the trimerization catalyst is a cationic metal coordination complex of Formula Ia:

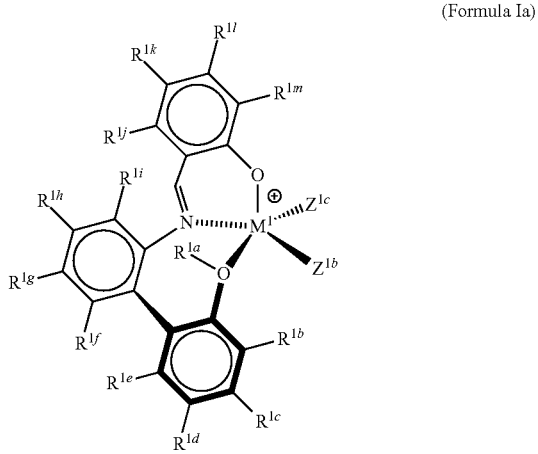

(Formula Ia)

wherein, $M^1$ is Ti, Zr, or Hf;

$Z^{1b}$ and $Z^{1c}$ are independently hydrogen or an optionally substituted substituent;

$R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl;

$R^{1b}$, $R^{1c}$, $R^{1d}$, and $R^{1e}$ are independently hydrogen or an optionally substituted substituent;

$R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent;

b. a polymerization catalyst, wherein the polymerization catalyst is a cationic metal coordination complex of Formula IIa:

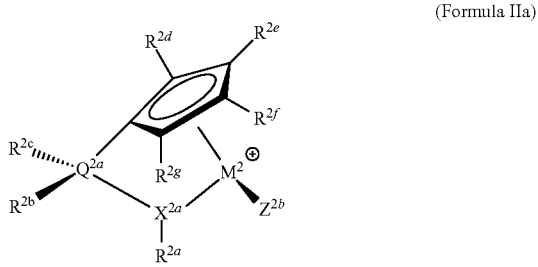

(Formula IIa)

wherein, $M^2$ is Ti, Zr, or Hf;

$Z^{2b}$ is hydrogen or an optionally substituted substituent;

$X^{2a}$ is O or N;

$Q^{2a}$ is C or Si;

$R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N;

$R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent; and c. an activated solid support, wherein the trimerization catalyst and the polymerization catalyst are attached to the activated solid support.

In various embodiments the invention provides a method for the preparation of a linear low density polyethylene (LLDPE) polymer, comprising: providing a supported catalyst system; and contacting the supported catalyst system with ethylene under conditions effective to promote the trimerization and polymerization of ethylene to form the linear low density polyethylene polymer, wherein the supported catalyst system, comprises:

a. a trimerization catalyst, wherein the trimerization catalyst is a cationic metal coordination complex of Formula Ia:

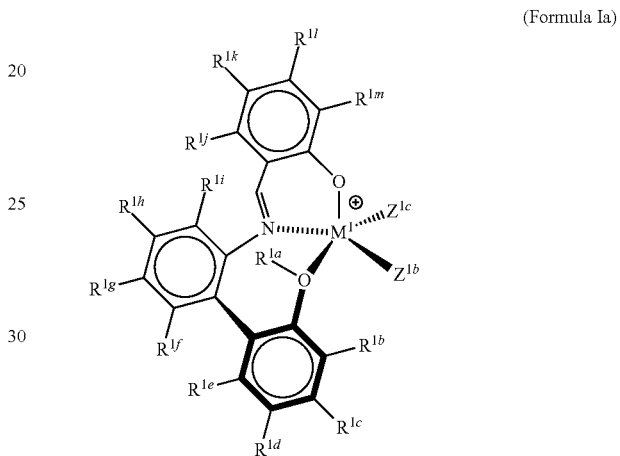

(Formula Ia)

wherein, $M^1$ is Ti, Zr, or Hf;

$Z^{1b}$ and $Z^{1c}$ are independently hydrogen or an optionally substituted substituent;

$R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl;

$R^{1b}$, $R^{1c}$, $R^{1d}$, and $R^{1e}$ are independently hydrogen or an optionally substituted substituent;

$R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent;

b. a polymerization catalyst, wherein the polymerization catalyst is a cationic metal coordination complex of Formula IIa:

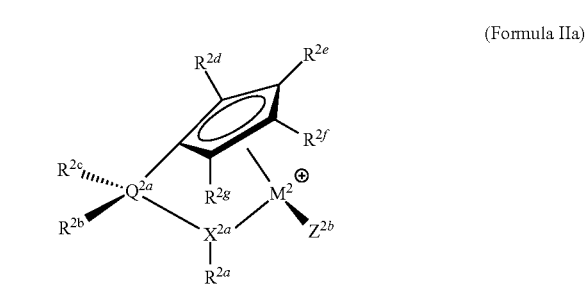

(Formula IIa)

wherein, $M^2$ is Ti, Zr, or Hf;

$Z^{2b}$ is hydrogen or an optionally substituted substituent;

$X^{2a}$ is O or N;

$Q^{2a}$ is C or Si;

$R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N;

$R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent; and c. an activated solid support, wherein the trimerization catalyst and the polymerization catalyst are attached to the activated solid support.

In various embodiments of a method for the preparation of a linear low density polyethylene (LLDPE) polymer, the activated solid support comprises one or more negative charges. In some embodiments, the attachment of the trimerization catalyst and the polymerization catalyst to the activated solid support is by an electrostatic bond between the catalysts and the activated solid support. In some embodiments, the trimerization catalyst and the polymerization catalyst are attached to the same activated solid support. In some embodiments, the activated solid support comprises one or more members, wherein the trimerization catalyst and the polymerization catalyst are attached to one or more of the same members. In some embodiments, the activated solid support is a particulate activated solid support comprising a plurality of particles, and the trimerization catalyst and the polymerization catalyst are attached to a same particle. In some embodiments, the activated solid support comprises one or more particles, wherein the trimerization catalyst and the polymerization catalyst are attached to one or more of the same particles. In some embodiments, the trimerization catalyst and the polymerization catalyst are both co-supported on the same activated solid support.

In various embodiments of a method for the preparation of a linear low density polyethylene (LLDPE) polymer, $Z^{1b}$ and $Z^{1c}$ are independently selected from alkyl and substituted alkyl; $Z^{2b}$ is selected from alkyl and substituted alkyl; and $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl. In some embodiments, $M^1$ is Ti; $Z^{1b}$ is methyl; $Z^{1c}$ is methyl; $M^2$ is Ti; and $Z^{2b}$ is methyl. In some embodiments, the cationic metal coordination complex of Formula Ia is:

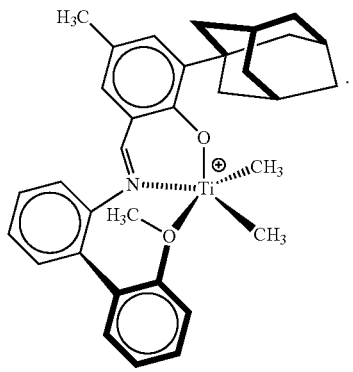

In some embodiments the cationic metal coordination complex of Formula IIa is:

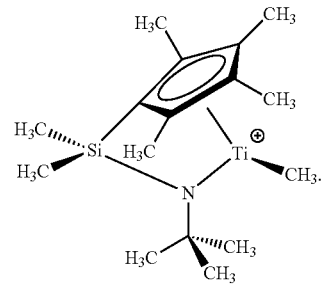

In some embodiments, the cationic metal coordination complex of Formula Ia is:

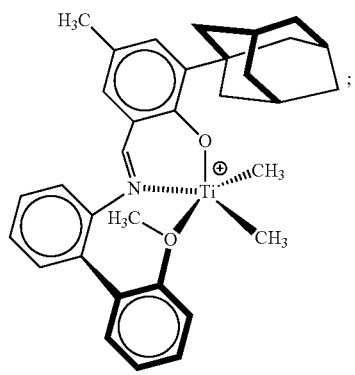

and the cationic metal coordination complex of Formula IIa is:

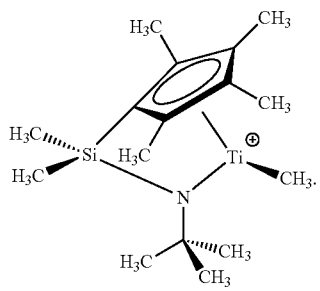

In various embodiments of a method for the preparation of a linear low density polyethylene (LLDPE) polymer, the activated solid support comprises an activator and a solid support, wherein the activator is attached to the solid support. In some embodiments, the activator is an aluminum compound. In some embodiments, the aluminum compound is an organoaluminoxane. In some embodiments, the organoaluminoxane is an alkylaluminoxane. In some embodiments, the alkylaluminoxane is methylaluminoxane. In some embodiments, the solid support comprises an inorganic material, an organic material, or a combination thereof. In some embodiments, the inorganic material is selected from silica, alumina, silica-alumina, zeolites, clays, mica, talc, magnesia, titania, zirconia, magnesium dichloride-alcohol adduct, or combinations thereof. In some embodiments, the inorganic material is silica. In some embodiments, the activated solid support is a particulate activated solid support. In some embodiments, the particulate activated solid support is free-flowing and disintegrable. In some embodiments, the activated solid support comprises methylaluminoxane and silica, wherein the methylaluminoxane is attached to the silica. In some embodiments, a ratio of the polymerization catalyst to the trimerization catalyst is from about 9:1 to about 1:1. In some embodiments, a ratio of the polymerization catalyst to the trimerization catalyst is 9:1, 8.9:1, 8.8:1, 8.7:1, 8.6:1, 8.5:1, 8.4:1, 8.3:1, 8.2:1, 8.1:1, 8.0:1, 7.9:1, 7.8:1, 7.7:1, 7.6:1, 7.5:1, 7.4:1, 7.3:1, 7.2:1, 7.1:1, 7.0:1, 6.9:1, 6.8:1, 6.7:1, 6.6:1, 6.5:1, 6.4:1, 6.3:1, 6.2:1, 6.1:1, 6.0:1, 5.9:1, 5.8:1, 5.7:1, 5.6:1, 5.5:1, 5.4:1, 5.3:1, 5.2:1, 5.1:1, 5.0:1, 4.9:1, 4.8:1, 4.7:1, 4.6:1, 4.5:1, 4.4:1, 4.3:1, 4.2:1, 4.1:1, 4.0:1, 3.9:1, 3.8:1, 3.7:1, 3.6:1, 3.5:1, 3.4:1, 3.3:1, 3.2:1, 3.1:1, 3.0:1, 2.9:1, 2.8:1, 2.7:1, 2.6:1, 2.5:1, 2.4:1, 2.3:1, 2.2:1, 2.1:1, 2.0:1, 1.9:1, 1.8:1, 1.7:1, 1.6:1, 1.5:1, 1.4:1, 1.3:1, 1.2:1, 1.1:1, or 1.1.

In some embodiments, the supported catalyst system is in the form of a slurry. In some embodiments, the supported catalyst system comprises an optional solvent. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments the optional solvent is toluene.

In various embodiments of a method for the preparation of a linear low density polyethylene (LLDPE) polymer, the supported catalyst system is in the form of a slurry. In various embodiments the method is performed in the presence of an optional solvent. In some embodiments, the optional solvent is a liquid aliphatic hydrocarbon, an aromatic hydrocarbon, or an alicyclic hydrocarbon, or any combinations thereof. In some embodiments, the optional solvent is isobutane, butane, pentane, hexane, heptane, octane, liquid paraffin, benzene, toluene, xylene, or cyclohexane, or any combinations thereof. In some embodiments the optional solvent is toluene. In some embodiments, the method is performed in the absence of a solvent. In some embodiments, the ethylene is trimerized to form 1-hexene. In some embodiments, the linear low density polyethylene polymer is a copolymer of ethylene and 1-hexene. In some embodiments, the amount of 1-hexene is from about 0.1 mol % to about 99 mol % of the copolymer. In some embodiments the amount of 1-hexene incorporation in the copolymer is from 0.1 mol % to 99 mol %, 0.5 mol % to 99 mol %, 1.0 mol % to 99 mol %, 1.5 mol % to 99 mol %, 2 mol % to 99 mol %, 3 mol % to 99 mol %, 4 mol % to 99 mol %, 5 mol % to 99 mol %, 6 mol % to 99 mol %, 7 mol % to 99 mol %, 8 mol % to 99 mol %, 9 mol % to 99 mol %, 10 mol % to 99 mol %, 11 mol % to 99 mol %, 12 mol % to 99 mol %, 13 mol % to 99 mol %, 14 mol % to 99 mol %, 15 mol % to 99 mol %, 16 mol % to 99 mol %, 17 mol % to 99 mol %, 18 mol % to 99 mol %, 19 mol % to 99 mol %, 20 mol % to 99 mol %, 25 mol % to 99 mol %, 30 mol % to 99 mol %, 40 mol % to 99 mol %, 50 mol % to 99 mol %, 60 mol % to 99 mol %, 70 mol % to 99 mol %, 80 mol % to 99 mol %, 0.1 mol % to 90 mol %, 0.1 mol % to 80 mol %, 0.1 mol % to 70 mol %, 0.1 mol % to 60 mol %, 0.1 mol % to 50 mol %, 0.1 mol % to 40 mol %, 0.1 mol % to 30 mol %, 0.1 mol % to 25 mol %, 0.1 mol % to 20 mol %, 0.1 mol % to 19 mol %, 0.1 mol % to 18 mol %, 0.1 mol % to 17 mol %, 0.1 mol % to 16 mol %, 0.1 mol % to 15 mol %, 0.1 mol % to 14 mol %, 0.1 mol % to 13 mol %, 0.1 mol % to 12 mol %, 0.1 mol % to 11 mol %, 0.1 mol % to 10 mol %, 0.1 mol % to 9 mol %, 0.1 mol % to 8 mol %, 0.1 mol % to 7 mol %, 0.1 mol % to 6 mol %, 0.1 mol % to 5 mol %, 0.1 mol % to 4 mol %, 0.1 mol % to 3 mol %, 0.1 mol % to 2.5 mol %, 0.1 mol % to 2.0 mol %, 0.1 mol % to 1.5 mol %, 0.1 mol % to 1.0 mol %, 0.1 mol % to 0.5 mol %, 0.5 mol % to 20 mol %, 0.5 mol % to 15 mol %, 0.5 mol % to 10 mol %, 0.5 mol % to 5 mol %, 0.5 mol % to 3 mol %, 0.5 mol % to 2 mol %; 1 mol % to 20 mol %, 1 mol % to 15 mol %, 1 mol % to 10 mol %, 1 mol % to 5 mol %, or 1 mol % to 3 mol %.

In various embodiments of a method for the preparation of a linear low density polyethylene (LLDPE) polymer, the linear low density polyethylene polymer has a weight average molecular weight ($M_w$) from about 10,000 Da to about 3,000,000 Da. In some embodiments of a method for the preparation of a linear low density polyethylene (LLDPE) polymer, the linear low density polyethylene polymer has a weight average molecular weight ($M_w$) from about 10,000 Da to about 3,000,000 Da; 10,000 Da to about 2,500,000 Da; 10,000 Da to about 2,000,000 Da; 10,000 Da to about 1,500,000 Da; 10,000 Da to about 1,000,000 Da; 10,000 Da to about 900,000 Da; 10,000 Da to about 800,000 Da; 10,000 Da to about 700,000 Da; 10,000 Da to about 600,000 Da; 10,000 Da to about 500,000 Da; 10,000 Da to about 400,000 Da; 10,000 Da to about 300,000 Da; 10,000 Da to about 200,000 Da; 10,000 Da to about 100,000 Da; 10,000 Da to about 90,000 Da; 10,000 Da to about 80,000 Da; 10,000 Da to about 70,000 Da; 10,000 Da to about 60,000 Da; 10,000 Da to about 50,000 Da; 10,000 Da to about 40,000 Da; 10,000 Da to about 30,000 Da; 10,000 Da to about 20,000 Da; 20,000 Da to about 3,000,000 Da, 30,000 Da to about 3,000,000 Da; 40,000 Da to about 3,000,000 Da; 50,000 Da to about 3,000,000 Da; 60,000 Da to about 3,000,000 Da; 70,000 Da to about 3,000,000 Da; 80,000 Da to about 3,000,000 Da; 90,000 Da to about 3,000,000 Da; 100,000 Da to about 3,000,000 Da; 200,000 Da to about 3,000,000 Da; 300,000 Da to about 3,000,000 Da; 400,000 Da to about 3,000,000 Da; 500,000 Da to about 3,000,000 Da; 600,000 Da to about 3,000,000 Da; 700,000 Da to about 3,000,000 Da; 800,000 Da to about 3,000,000 Da; 900,000 Da to about 3,000,000 Da; 1,000,000 Da to about 3,000,000 Da; 1,500,000 Da to about 2,000,000 Da; or 1,000,000.

In various embodiments of a method for the preparation of a linear low density polyethylene (LLDPE) polymer, the linear low density polyethylene polymer has a number average molecular weight ($M_n$) from about 2,500 Da to about 1,000,000 Da; 2,500 Da to about 900,000 Da; 2,500 Da to about 800,000 Da; 2,500 Da to about 700,000 Da; 2,500 Da to about 600,000 Da; 2,500 Da to about 500,000 Da; 2,500 Da to about 400,000 Da; 2,500 Da to about 300,000 Da; 2,500 Da to about 200,000 Da; 2,500 Da to about 100,000 Da; 2,500 Da to about 90,000 Da; 2,500 Da to about 80,000 Da; 2,500 Da to about 70,000 Da; 2,500 Da to about 60,000 Da; 2,500 Da to about 50,000 Da; 2,500 Da to about 40,000 Da; 2,500 Da to about 30,000 Da; 2,500 Da to about 20,000 Da; 2,500 Da to about 15,000 Da; 2,500 Da to about 10,000 Da; 2,500 Da to about 5,000 Da; 10,000 Da to about 1,000,000 Da; 20,000 Da to about 1,000,000 Da; 30,000 Da to about 1,000,000 Da; 40,000 Da to about 1,000,000 Da; 50,000 Da to about 1,000,000 Da; 60,000 Da to about 1,000,000 Da; 70,000 Da to about 1,000,000 Da; 80,000 Da to about 1,000,000 Da; 90,000 Da to about 1,000,000 Da; 100,000 Da to about 1,000,000 Da; 200,000 Da to about 1,000,000 Da; 300,000 Da to about 1,000,000 Da; 400,000 Da to about 1,000,000 Da; 500,000 Da to about 1,000,000 Da; 600,000 Da to about 1,000,000 Da; 700,000 Da to about 1,000,000 Da; 800,000 Da to about 1,000,000 Da; or 900,000 Da to about 1,000,000 Da.

In various embodiments of a method for the preparation of a linear low density polyethylene (LLDPE) polymer, the linear low density polyethylene polymer has a crystallinity of about 1% to about 30%. In various embodiments of a method for the preparation of a linear low density polyethylene (LLDPE) polymer, the linear low density polyethylene polymer has a crystallinity of 1% to 30%, 1% to 25%; 1% to 20%; 1% to 15%, 1% to 10%, 5% to 30%, 10% to 30%, 15% to 30%, or 20% to 30%.

In various embodiments of a method for the preparation of a linear low density polyethylene (LLDPE) polymer the ethylene is mixed with an inert gas (e.g., argon containing ethylene). In various embodiments the ethylene is polymerization grade ethylene. In various embodiments the ethylene has a purity of >95%. In various embodiments the ethylene has a purity of ≥95%. In various embodiments the ethylene has a purity of ≥99%. In various embodiments the ethylene has a purity of ≥99.8%. In various embodiments the ethylene has a purity of ≥99.9%.

In various embodiments of a method for the preparation of a linear low density polyethylene (LLDPE) polymer, comprising: providing a supported catalyst system; and contacting the supported catalyst system with ethylene under conditions effective to promote the tandem trimerization and polymerization of ethylene to form the linear low density polyethylene polymer, wherein the conditions comprise ethylene at ≥1 atmosphere pressure, ≥2 atmosphere pressure; ≥3 atmosphere pressure; ≥4 atmosphere pressure; ≥5 atmosphere pressure; or ≥10 atmosphere pressure.

In various embodiments of a method for the preparation of a linear low density polyethylene (LLDPE) polymer, comprising: providing a supported catalyst system; and contacting the supported catalyst system with ethylene under conditions effective to promote the trimerization and polymerization of ethylene to form the linear low density polyethylene polymer, wherein the conditions comprise ethylene at ≥1 atmosphere pressure, ≥2 atmosphere pressure; ≥3 atmosphere pressure; ≥4 atmosphere pressure; ≥5 atmosphere pressure; or ≥10 atmosphere pressure.

In various embodiments the supported catalyst systems of the present invention may be used as a slurry or in slurry polymerization to generate the LLDPE polymer. The slurry or slurry polymerization may be in the absence or presence of a solvent. Non-limiting examples of suitable solvents include liquid aliphatic hydrocarbons such as isobutane, butane, pentane, hexane, heptane, octane or liquid paraffin, aromatic hydrocarbons such as benzene, toluene or xylene, alicyclic hydrocarbons such as cyclohexane. These solvents may be used either alone or in admixtures or combinations with each other. In some embodiments the solvent used in the slurry or in the slurry polymerization is toluene.

Various Non-Limiting Embodiments

Other features and embodiments of the present invention include one or more of the following numbered paragraphs.
1. A catalyst system comprising of:
  (A) Group IV polymerization catalyst with the general formula:

(QR$_2$X$_2$)MZ$_n$

Q=C, Si; R═H, alkyl, aryl); X═—NR, —OR, aromatic anion; M=Ti, Zr, Hf; Z=chloro, methyl, etc.; n=2.
  (B) Group IV ethylene trimerization catalyst having the general formula (LX)MZ$_n$ L=iminophenolate, iminoamino, anilido; X=phenolato, —NR; M=Ti, Zr, Hf; Z=chloro, methyl, etc.; n=3.
  (C) an organoaluminum compound
  (D) a free-flowing, disintegrable, particulate solid support.
2. The polymerization catalyst in paragraph 1 wherein the precatalyst (A) is included.

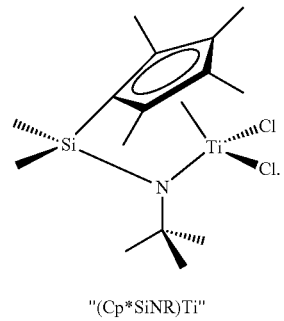

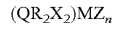
"(Cp*SiNR)Ti"

3. The trimerization catalyst in paragraph 2 wherein the precatalyst (B) is included:

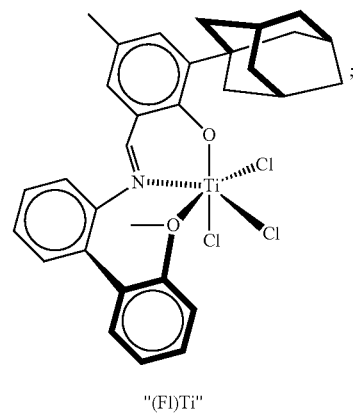

"(FI)Ti"

4. The catalyst system of paragraph 1 wherein the organoaluminum compound (C) consists of aluminoxane with or without free and/or associated molecular alkyl aluminum compounds.
5. The catalyst system of paragraph 2 wherein the aluminoxane in claim 3 especially includes methylaluminoxane.
6. The catalyst system of paragraph 1 wherein the solid support (D) includes inorganic and organic materials.
7. The catalyst system of paragraph 1 wherein the inorganic materials in claim 6 include silica, alumina, silica-alumina, zeolites, clays, mica, talc, magnesia, titania, zirconia, magnesium dichloride•alcohol adduct, or mixtures thereof that, in combination with the organoaluminum compound (C), can react with the catalysts (A) and (B).
8. The catalyst system of paragraph 1 can be used in slurry with organic solvents or solvent-free the generate LLDPE.
9. The catalyst systems of paragraphs 1-7 may produce resins:

Some embodiments of the present invention can be defined as any of the following numbered paragraphs:

1. A supported catalyst system, comprising:
a. a trimerization catalyst, wherein the trimerization catalyst is a cationic metal coordination complex of Formula Ia:

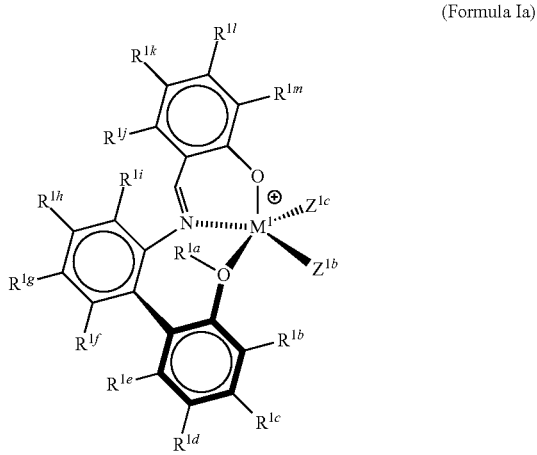

(Formula Ia)

wherein,
$M^1$ is Ti, Zr, or Hf;
$Z^{1b}$ and $Z^{1c}$ are independently hydrogen or an optionally substituted substituent;
$R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl;
$R^{1b}$, $R^{1c}$, $R^{1d}$, and $R^{1e}$ are independently hydrogen or an optionally substituted substituent;
$R^{1f}$, $R^{1g}$, $R^{1h}$, and $R^{1i}$ are independently hydrogen or an optionally substituted substituent; and
$R^{1j}$, $R^{1k}$, $R^{1l}$, and $R^{1m}$ are independently hydrogen or an optionally substituted substituent;
b. a polymerization catalyst, wherein the polymerization catalyst is a cationic metal coordination complex of Formula IIa:

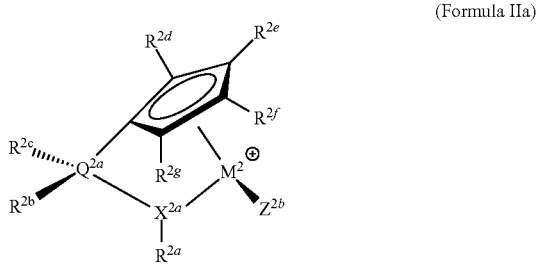

(Formula IIa)

wherein,
$M^2$ is Ti, Zr, or Hf;
$Z^{2b}$ is hydrogen or an optionally substituted substituent;
$X^{2a}$ is O or N;
$Q^{2a}$ is C or Si;
$R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N;
$R^{2b}$ and $R^{2c}$ are independently hydrogen or an optionally substituted substituent; and
$R^{2d}$, $R^{2e}$, $R^{2f}$ and $R^{2g}$ are independently hydrogen or an optionally substituted substituent; and
c. an activated solid support, wherein the trimerization catalyst and the polymerization catalyst are attached to the activated solid support.

2. The supported catalyst system of paragraph 1, wherein the activated solid support comprises one or more negative charges.

3. The supported catalyst system of paragraph 2, wherein the attachment of the trimerization catalyst and the polymerization catalyst to the activated solid support is by an electrostatic bond between the catalysts and the activated solid support.

4. The supported catalyst system of paragraph 1, wherein
$Z^{1b}$ and $Z^{1c}$ are independently selected from alkyl and substituted alkyl;
$Z^{2b}$ is selected from alkyl and substituted alkyl; and
$R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl.

5. The supported catalyst system of paragraph 1, wherein
$M^1$ is Ti;
$M^2$ is Ti;
$Z^{1b}$ and $Z^{1c}$ are independently selected from alkyl and substituted alkyl;
$Z^{2b}$ is selected from alkyl and substituted alkyl; and
$R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl.

6. The supported catalyst system of paragraph 1, wherein
$M^1$ is Ti;
$Z^{1b}$ is methyl;
$Z^{1c}$ is methyl;
$M^2$ is Ti; and
$Z^{2b}$ is methyl.

7. The supported catalyst system of paragraph 4, wherein
$M^1$ is Ti;
$Z^{1b}$ is methyl;
$Z^{1c}$ is methyl;
$M^2$ is Ti; and
$Z^{2b}$ is methyl.

8. The supported catalyst system of paragraph 1, wherein the cationic metal coordination complex of Formula Ia is:

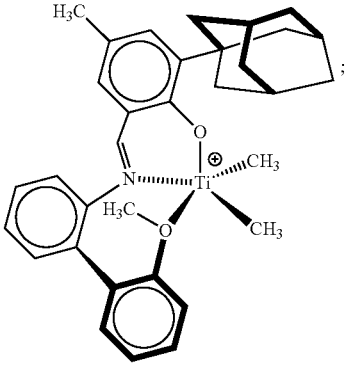

;

and
the cationic metal coordination complex of Formula IIa is:

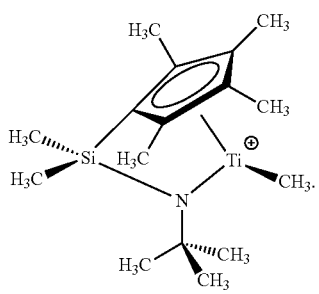

9. The supported catalyst system of paragraph 1, wherein the activated solid support comprises an activator and a solid support, wherein the activator is attached to the solid support.

10. The supported catalyst system of paragraph 9, wherein the activator is an aluminum compound.

11. The supported catalyst system of paragraph 10, wherein the aluminum compound is an organoaluminoxane.

12. The supported catalyst system of paragraph 11, wherein the organoaluminoxane is an alkylaluminoxane.

13. The supported catalyst system of paragraph 12, wherein the alkylaluminoxane is methylaluminoxane.

14. The supported catalyst system of paragraph 9, wherein the activator is methylaluminoxane.

15. The supported catalyst system of paragraph 9, wherein the solid support comprises an inorganic material, an organic material, or a combination thereof.

16. The supported catalyst system of paragraph 15, wherein the inorganic material is selected from silica, alumina, silica-alumina, zeolites, clays, mica, talc, magnesia, titania, zirconia, magnesium dichloride-alcohol adduct, or combinations thereof.

17. The supported catalyst system of paragraph 16, wherein the inorganic material is silica.

18. The supported catalyst system of paragraph 9, wherein the solid support is silica.

19. The supported catalyst system of paragraph 1, wherein the activated solid support is a particulate activated solid support.

20. The supported catalyst system of paragraph 19, wherein the particulate activated solid support is free-flowing and disintegrable.

21. The supported catalyst system of paragraph 1, wherein the activated solid support comprises methylaluminoxane and silica, wherein the methylaluminoxane is attached to the silica.

22. The supported catalyst system of paragraph 1, wherein a ratio of the polymerization catalyst to the trimerization catalyst is from about 9:1 to about 1:1.

23. The supported catalyst system of paragraph 1, wherein the supported catalyst system is in the form of a slurry.

24. The supported catalyst system of paragraph 1, further comprising an optional solvent.

25. The supported catalyst system of paragraph 24, wherein the optional solvent is a liquid aliphatic hydrocarbon, an aromatic hydrocarbon, or an alicyclic hydrocarbon, or any combinations thereof.

26. The supported catalyst system of paragraph 24, wherein the optional solvent is isobutane, butane, pentane, hexane, heptane, octane, liquid paraffin, benzene, toluene, xylene, or cyclohexane, or any combinations thereof.

27. A method to prepare a supported catalyst system, comprising:
a. obtaining a solid support;
b. contacting the solid support with an activator to obtain an activated solid support; and
c. contacting the activated solid support with a precatalyst mixture, wherein the precatalyst mixture comprises a trimerization precatalyst, a polymerization precatalyst, and an optional solvent, wherein the trimerization precatalyst is a metal coordination complex of Formula I:

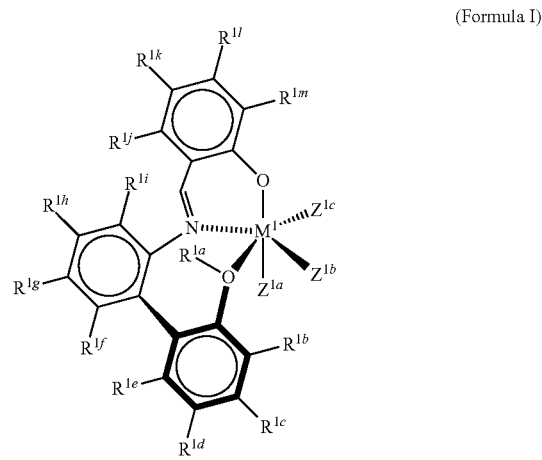

(Formula I)

wherein,
$M^1$ is Ti, Zr, or Hf;
$Z^{1a}$, $Z^{1b}$, and $Z^{1c}$ are independently hydrogen or an optionally substituted substituent;
$R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl;
$R^{1b}$, $R^{1c}$, $R^{1d}$, and $R^{1e}$ are independently hydrogen or an optionally substituted substituent;
$R^{1f}$, $R^{1g}$, $R^{1h}$, and $R^{1i}$ are independently hydrogen or an optionally substituted substituent; and
$R^{1j}$, $R^{1k}$, $R^{1l}$, and $R^{1m}$ are independently hydrogen or an optionally substituted substituent; and
the polymerization precatalyst is a metal coordination complex of Formula II:

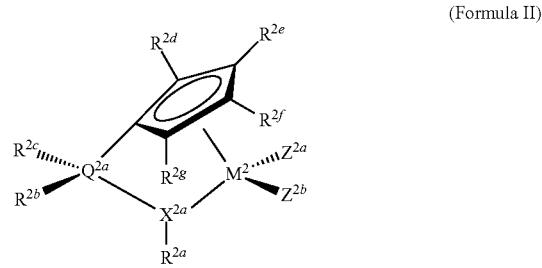

(Formula II)

wherein,
$M^2$ is Ti, Zr, or Hf;
$Z^{2a}$ and $Z^{2b}$ are independently hydrogen or an optionally substituted substituent;
$X^{2a}$ is O or N;
$Q^{2a}$ is C or Si;
$R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N;

$R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent.

28. The method of paragraph 27, wherein
$Z^{1a}$ $Z^{1b}$ and $Z^{1c}$ are independently selected from halogen, alkyl, and substituted alkyl;
$Z^{2a}$ and $Z^{2b}$ are independently selected from halogen, alkyl, and substituted alkyl; and
$R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl.

29. The method of paragraph 27, wherein
$M^1$ is Ti;
$M^2$ is Ti;
$Z^{1a}$ $Z^{1b}$ and $Z^{1c}$ are independently selected from halogen, alkyl, and substituted alkyl;
$Z^{2a}$ and $Z^{2b}$ are independently selected from halogen, alkyl, and substituted alkyl; and
$R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl.

30. The method of paragraph 27, wherein $M^1$ is Ti; and $M^2$ is Ti.

31. The method of paragraph 28, wherein $M^1$ is Ti; and $M^2$ is Ti.

32. The method of paragraph 27, wherein the metal coordination complex of Formula I is:

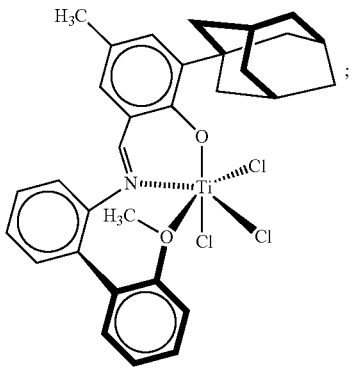

and
the metal coordination complex of Formula II is:

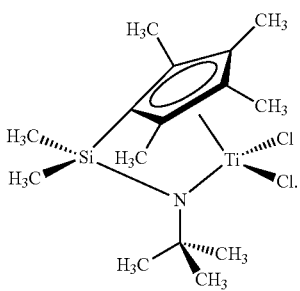

33. The method of paragraph 27, wherein the activator comprises an aluminum compound.

34. The method of paragraph 33, wherein the aluminum compound is an organoaluminoxane.

35. The method of paragraph 34, wherein the organoaluminoxane is an alkylaluminoxane.

36. The method of paragraph 35, wherein the alkylaluminoxane is methylaluminoxane.

37. The method of paragraph 27, wherein the activator is methylaluminoxane.

38. The method of paragraph 27, wherein the solid support comprises an inorganic material, an organic material, or a combination thereof.

39. The method of paragraph 38, wherein the inorganic material is selected from silica, alumina, silica-alumina, zeolites, clays, mica, talc, magnesia, titania, zirconia, magnesium dichloride-alcohol adduct, or combinations thereof.

40. The method of paragraph 39, wherein the inorganic material is silica.

41. The method of paragraph 27, wherein the solid support is silica.

42. The method of paragraph 27, wherein the solid support is a particulate solid support.

43. The method of paragraph 42, wherein the solid support is free-flowing and disintegrable.

44. The method of paragraph 27, wherein a ratio of the polymerization precatalyst to the trimerization precatalyst is from about 9:1 to about 1:1.

45. The method of paragraph 27, wherein the optional solvent is a liquid aliphatic hydrocarbon, an aromatic hydrocarbon, or an alicyclic hydrocarbon, or any combinations thereof.

46. The method of paragraph 27, wherein the optional solvent is isobutane, butane, pentane, hexane, heptane, octane, liquid paraffin, benzene, toluene, xylene, or cyclohexane, or any combinations thereof.

47. The method of paragraph 27, wherein the optional solvent is toluene.

48. The method of paragraph 27, wherein the supported catalyst system is according to paragraph 1.

49. A method for the preparation of a linear low density polyethylene (LLDPE) polymer, comprising:
   a. providing a supported catalyst system of paragraph 1;
   b. contacting the supported catalyst system of paragraph 1 with ethylene under conditions effective to promote the tandem trimerization and polymerization of ethylene to form the linear low density polyethylene polymer.

50. The method of paragraph 49, wherein the activated solid support comprises one or more negative charges.

51. The method of paragraph 49, wherein the attachment of the trimerization catalyst and the polymerization catalyst to the activated solid support is by an electrostatic bond between the catalysts and the activated solid support.

52. The method of paragraph 49, wherein
$Z^{1b}$ and $Z^{1c}$ are independently selected from alkyl and substituted alkyl;
$Z^{2b}$ is selected from alkyl and substituted alkyl; and
$R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl.

53. The method of paragraph 49, wherein
$M^1$ is Ti;
$M^2$ is Ti;
$Z^{1b}$ and $Z^{1c}$ are independently selected from alkyl and substituted alkyl;

$Z^{2b}$ is selected from alkyl and substituted alkyl; and
$R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl.

54. The method of paragraph 49, wherein
$M^1$ is Ti;
$Z^{1b}$ is methyl;
$Z^{1c}$ is methyl;
$M^2$ is Ti; and
$Z^{2b}$ is methyl.

55. The method of paragraph 52, wherein
$M^1$ is Ti;
$Z^{1b}$ is methyl;
$Z^{1c}$ is methyl;
$M^2$ is Ti; and
$Z^{2b}$ is methyl.

56. The method of paragraph 49, wherein the cationic metal coordination complex of Formula Ia is:

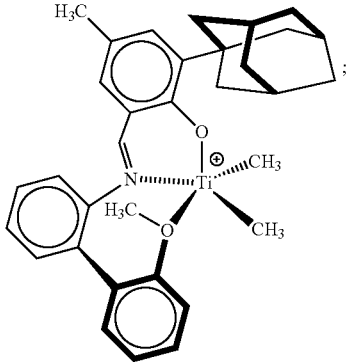

and
the cationic metal coordination complex of Formula IIa is:

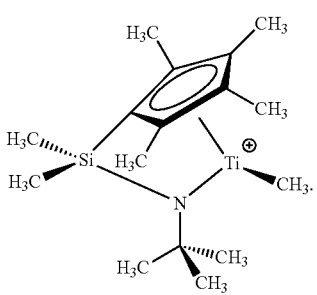

57. The method of paragraph 49, wherein the activated solid support comprises an activator and a solid support, wherein the activator is attached to the solid support.

58. The method of paragraph 57, wherein the activator is an aluminum compound.

59. The method of paragraph 58, wherein the aluminum compound is an organoaluminoxane.

60. The method of paragraph 59, wherein the organoaluminoxane is an alkylaluminoxane.

61. The method of paragraph 60, wherein the alkylaluminoxane is methylaluminoxane.

62. The method of paragraph 57, wherein the activator is methylaluminoxane.

63. The method of paragraph 57, wherein the solid support comprises an inorganic material, an organic material, or a combination thereof.

64. The method of paragraph 63, wherein the inorganic material is selected from silica, alumina, silica-alumina, zeolites, clays, mica, talc, magnesia, titania, zirconia, magnesium dichloride-alcohol adduct, or combinations thereof.

65. The method of paragraph 64, wherein, the inorganic material is silica.

66. The method of paragraph 57, wherein the solid support is silica.

67. The method of paragraph 65, wherein the activated solid support is a particulate activated solid support.

68. The method of paragraph 67, wherein the particulate activated solid support is free-flowing and disintegrable.

69. The method of paragraph 49, wherein the activated solid support comprises methylaluminoxane and silica, wherein the methylaluminoxane is attached to the silica.

70. The method of paragraph 49, wherein a ratio of the polymerization catalyst to the trimerization catalyst is from about 9:1 to about 1:1.

71. The method of paragraph 49, wherein the supported catalyst system of claim 1 further comprises an optional solvent.

72. The method of paragraph 71, wherein the optional solvent is a liquid aliphatic hydrocarbon, an aromatic hydrocarbon, or an alicyclic hydrocarbon, or any combinations thereof.

73. The method of paragraph 71, wherein the optional solvent is isobutane, butane, pentane, hexane, heptane, octane, liquid paraffin, benzene, toluene, xylene, or cyclohexane, or any combinations thereof.

74. The method of paragraph 49, wherein the supported catalyst system is in the form of a slurry.

75. The method of paragraph 49, wherein the method is performed in the presence of an optional solvent.

76. The method of paragraph 75, wherein the optional solvent is a liquid aliphatic hydrocarbon, an aromatic hydrocarbon, or an alicyclic hydrocarbon, or any combinations thereof.

77. The method of paragraph 75, wherein the optional solvent is isobutane, butane, pentane, hexane, heptane, octane, liquid paraffin, benzene, toluene, xylene, or cyclohexane, or any combinations thereof.

78. The method of paragraph 49, wherein the method is performed in the absence of a solvent.

79. The method of paragraph 49, wherein the ethylene is trimerized to form 1-hexene.

80. The method of paragraph 49, wherein the linear low density polyethylene polymer is a copolymer of ethylene and 1-hexene.

81. The method of paragraph 80, wherein the amount of 1-hexene is from about 0.1 mol % to about 99 mol % of the copolymer.

82. The method of paragraph 49, wherein the linear low density polyethylene polymer has a weight average molecular weight ($M_w$) from about 10,000 Da to about 3,000,000 Da.

83. The method of paragraph 49, wherein the low linear density polyethylene has a crystallinity of about 1% to about 30%.

84. The method of paragraph 49, wherein the ethylene has a purity of >95%.

85. The method of paragraph 49, wherein the conditions comprise ethylene at ≥1 atmosphere pressure.

86. The method of paragraph 49, wherein the conditions comprise ethylene at ≥4 atmosphere pressure.

87. The method of paragraph 1, wherein the trimerization catalyst and the polymerization catalyst are attached to the same activated solid support.
88. The method of paragraph 27, wherein contacting the activated solid support with the precatalyst mixture is performed under conditions effective to prepare the supported catalyst system.
89. The method of paragraph 27, wherein the trimerization catalyst and the polymerization catalyst are attached to the same activated solid support.
90. The method of paragraph 49, wherein the trimerization catalyst and the polymerization catalyst are attached to the same activated solid support.

EXAMPLES

The invention is further illustrated by the following examples which are intended to be purely exemplary of the invention, and which should not be construed as limiting the invention in any way. The following examples are illustrative only, and are not intended to limit, in any manner, any of the aspects described herein. The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention.

Experimental Section (A)

General Considerations.

All reactions unless stated otherwise stated were carried out under an inert dinitrogen atmosphere using standard glovebox, Schlenck line and high-vacuum line techniques. Toluene was obtained from a solvent purification system with activated alumina columns, degassed and left over 4 Å molecular sieves for at least 16 hours prior to use.

Methylaluminoxane (MAO) (30% w/v in toluene) was obtained from Albermarle Corporation and stored at −30° C. in a dinitrogen glovebox freezer. Silica (MS-3030) was obtained from PQ Corporation at heated at 300° C. under vacuum for 5 h and then stored in a dinitrogen glovebox. (FI)Ti and (Cp*SiNR)Ti were prepared from literature procedures. Ethylene was purified by passage through a column containing activated molecular sieves and MnO dispersed on vermiculite. (Shriver, D. F.; Drezdzon, M. A.; *The Manipulation of Air-Sensitive Compounds*, 2nd ed.; Wiley-Interscience: New York, 1986; chapter 3, pp 78-80).

Representative Procedure for the Preparation of Co-Supported Catalysts.

In a dinitrogen-filled glovebox a 100 mL round bottom flask was charged with a Teflon stir bar, MS-3030 silica (2.005 g) and toluene (25 mL). To this stirring suspension 3.5 mL of 30% MAO was added dropwise. The reaction was allowed to stir at ambient temperature for 2 hours. To this mixture (FI)Ti (8.2 mg, 14 µmol) and (Cp*SiNR)Ti (15 mg, 41 µmol) in toluene (10 mL). After inserting a 180° connector equipped with Teflon valve the round bottom flask was taken out of the glovebox and stirred on a vacuum line at 30° C. for 1 hour, then toluene was removed under vacuum to obtain a dry orange powder (yield: 2.971 g).

Representative Procedure for Tandem Trimerization and Copolymerization of Ethylene.

In a dinitrogen-filled glovebox a 250 mL round bottom flask was charged with a Teflon stir bar, s-(FI)Ti(2)-(Cp*SiNR)Ti(1) (0.590 g) and 100 mL of toluene. After inserting a 180° connector equipped with Teflon valve the round bottom flask was moved from the glovebox to a vacuum line, and the slurry was cooled and degassed under high vacuum. The ethylene was supplied at 1 atm and the reaction mixture was stirred for 3 hours at 25° C. At this point the reaction was quenched with 2 mL of 12 M HCl and 10 mL of methanol. Acetone (20 mL) was added to aid polymer precipitation; the solid was filtered off and washed with methanol. The isolated polymer (Yield: 11.667) was dried under vacuum for 3 hours prior to $^{13}C$ NMR analysis.

Gel Permeation Chromatography
Chromatographic Conditions
HT-GPC
Solvent: TCB (1,2,4-Trichlorobenzene)
Flow rate: 1.0 ml/min
Injection volume: 200 µl
Column/Detector temperature: 140 C.°
Columns: 3× ViscoGEL HR-(S) HT 7.8 cm
GPC System HT-GPC 350A
Sample Preparation for high temperature GPC About 5.5 mg of the material was placed into a 40 ml glass vial and accurately weighed. 10 ml of the solvent was added using a clean 10 ml glass pipette. The vial was capped with a Teflon coated cap and the samples were placed into the Vortex Auto Sampler and left to dissolve for 3 hrs at 140° C. while stirring gently. Broad polystyrene samples were also used as controls.

Data Analysis. The polymer samples were successfully analysed by the Triple Detection method. Triple detection GPC is the most powerful and accurate method as it provides molecular weight and size directly from the viscometer and light scattering detectors without column calibration. The detector alignment and instrument sensitivity parameters were previously determined using a narrow polystyrene standard. A broad polystyrene standard was used for system verification.

Differential Scanning Calorimetry.

About 6.5 mg of the samples were taken for the analysis, with heating & cooling at a rate of 10° C./min under a nitrogen atmosphere. Each sample was analyzed twice for accuracy, and the average value reported as shown in Table 5.

TABLE 3

Tandem trimerization and copolymerization of ethylene with s-FI(Ti)-(Cp*SiNR)Ti

| Entry[a] | Sample ID | (FI)Ti:(Cp*SiNR)Ti | Ti loading (µmol/g)[b] | Amount (mg)[c] | Yield (g)[d] | 1-hexene incorporation[e] |
|---|---|---|---|---|---|---|
| 1 | DA_01_37 | 1:1 | 18 | 554 | 6.02 | >50% |
| 2 | DA_01_67 | 1:2 | 18 | 620 | 10.70 | 20% |
| 3 | DA_01_71 | 1:2.6 | 16 | 598 | 7.26 | 16% |

TABLE 3-continued

Tandem trimerization and copolymerization of ethylene with s-FI(Ti)-(Cp*SiNR)Ti

| Entry[a] | Sample ID | (FI)Ti:(Cp*SiNR)Ti | Ti loading ($\mu$mol/g)[b] | Amount (mg)[c] | Yield (g)[d] | 1-hexene incorporation[e] |
|---|---|---|---|---|---|---|
| 4 | DA_01_77 | 1:3 | 18 | 590 | 11.67 | 7.0% |
| 5 | DA_01_61 | 1:4 | 18 | 597 | 4.41 | 1.8% |
| 6 | DA_01_47 | 1:5 | 18 | 599 | 5.57 | 1.2% |
| 7 | DA_01_57 | 1:5 | 18 | 607 | 5.59 | 1.1% |
| 8 | DA_01_41 | 1:10 | 18 | 550 | 7.39 | 0% |
| 9 | DA_01_123 | 1:3 | 18 | 304 | 9.25 | 20% |
| 10 | DA_01_79 | 1:3 | 18 | 590 | 1.31 | >50% |

[a]Reactions in entries 1-8 were carried out as a slurry with 100 mL of toluene under 1 atmosphere ethylene pressure. Entry 9 was carried out at 3.4 atmosphere ethylene pressure with 50 mL of toluene. Entry 10 is a solvent free polymerization at 1 atmosphere of ethylene. All reactions were run for 3 hours.
[b]The total titanium content in the co-supported catalyst.
[c]The amount of the co-supported silica catalyst used in the experiment.
[d]Total dry weight of isolated polymer + catalyst residue (including silica).
[e]1-Hexene incorporation as determined using quantitative $^{13}$C NMR spectroscopy.

TABLE 4

Molecular weight analysis of selected copolymers generated using co-supported catalyst system using high temperature gel permeation chromatography (GPC).

| Entry | Sample ID | $M_w$[a] | PDI[b] | 1-hexene incorporation |
|---|---|---|---|---|
| 1 | DA-01-47 | 986,000 | 2.38 | 1.2% |
| 2 | DA-01-57 | 1,118,000 | 4.08 | 1.1% |
| 3 | DA-01-61 | 788,000 | 3.20 | 1.8% |
| 4 | DA-01-67 | 693,000 | 1.88 | 20% |

[a]$M_w$: Weight average molecular weight (Dalton); average of two measurements.
[b]Polydispersity index; average of two measurements.

TABLE 5

Differential Scanning Calorimetry data of selected copolymers generated using co-supported catalyst system.

| Entry | Sample ID | $T_m$ (° C.)[a] | % crystallinity[a] | 1-hexene incorporation |
|---|---|---|---|---|
| 1 | DA-01-47 | 119.2 | 18.4 | 1.2% |
| 2 | DA-01-57 | 120.4 | 27.7 | 1.1% |
| 3 | DA-01-61 | 116.9 | 16.6 | 1.8% |
| 4 | DA-01-67 | 114.4 | 3.3 | 20% |

[a]Average of two measurements.

NMR Spectra.

Figure 5:
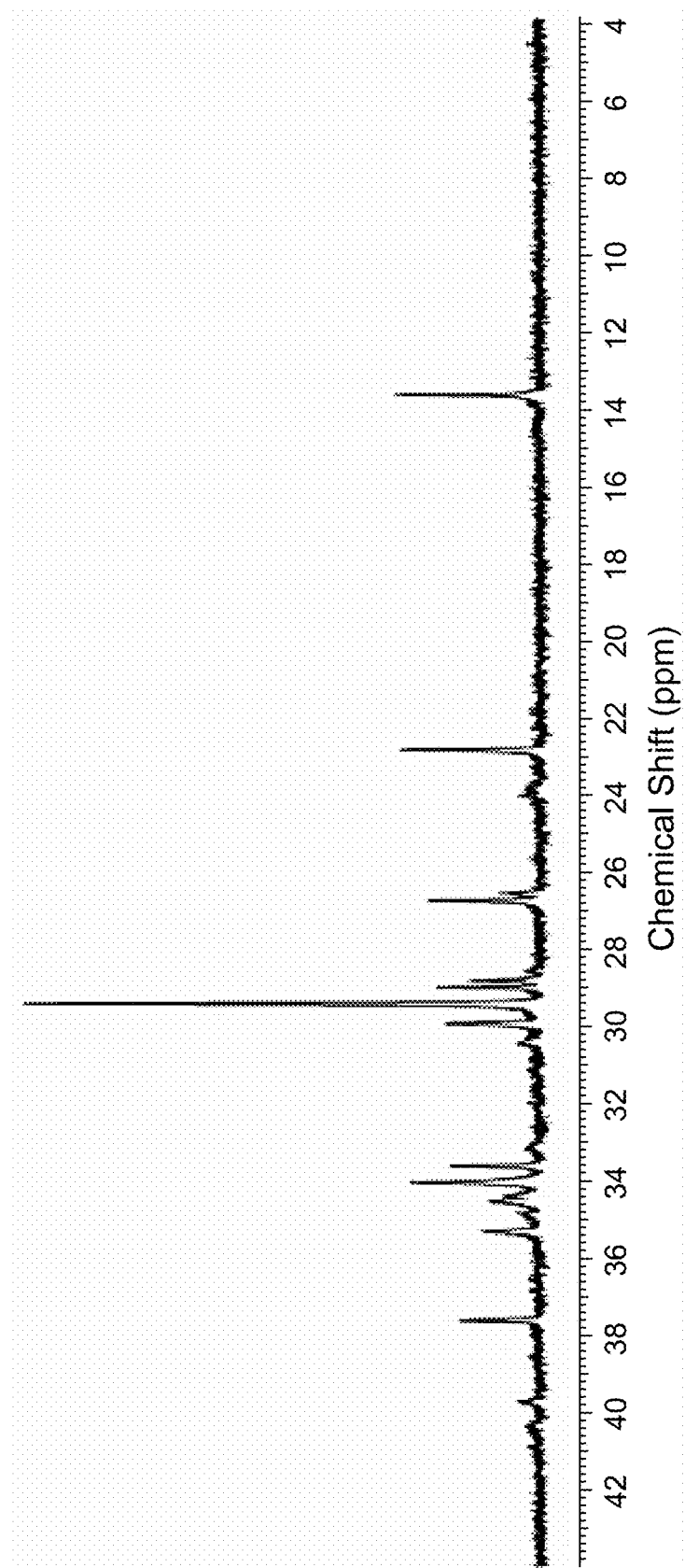
FIG. 5 depicts in accordance with various embodiments of the invention, a $^{13}C$ NMR spectrum (130° C., tetrachloroethane, 500 MHz) of LLDPE sample (ID=DA-01-67) prepared using co-supported catalyst system. Sample ID=DA-01-67 comprises 20% 1-hexene incorporation.

$^{13}$C NMR spectrum (130° C., tetrachloroethane, 500 MHz) of LLDPE sample (ID=DA-01-67) prepared using co-supported catalyst system (FIG. 5).

Experimental Section (B)

General Considerations.

All reactions unless otherwise stated were carried out under an inert dinitrogen atmosphere using standard glovebox, Schlenk line and high-vacuum line techniques. Toluene was obtained from a solvent purification system with activated alumina columns, degassed and left over 4 Å molecular sieves for at least 16 hours prior to use. Methylaluminoxane (MAO) (30% w/v in toluene) was obtained from Albermarle Corporation and stored at −30° C. in a dinitrogen glovebox freezer. Silica (MS-3030) was obtained from PQ Corporation at heated at 300° C. under vacuum for 5 h and then stored in a dinitrogen glovebox. (FI)TiCl$_3$ and (Cp*SiNR)TiCl$_2$ were prepared according to literature procedures. (Suzuki, Y.; Kinoshita, S.; Shibahara, A.; Ishii, S.; Kawamura, K.; Inoue, Y.; Fujita, T. *Organometallics* 2010, 29, 2396; Okuda, J.; *Chem. Ber.* 1990, 123, 1649). $^{13}$C labelled 1-hexene was synthesized from $^{13}$C labelled methyl iodide according to a literature procedure. (Chen, C.; Dugan, T. R.; Brennessel, W. W.; Weix, D. J.: Holland, P. L. *J. Am, Chem. Soc.* 2014, 136, 945). Ethylene was purified by passage through a column containing activated molecular sieves and MnO dispersed on vermiculite. (Shriver, D. F.; Drezdzon, M. A.; *The Manipulation of Air-Sensitive Compounds,* 2nd ed.; Wiley-Interscience: New York, 1986; chapter 3, pp 78-80). Polymerizations at pressures >1 atmosphere were carried out in a glass reactor (miniclave Steel™ type 1/300 mL, 10 bar) obtained from Buchiglas-USA.

Representative Procedure for the Preparation of Co-Supported Catalysts.

In a dinitrogen-filled glovebox a 100 mL round bottom flask was charged with a Teflon stir bar, MS-3030 silica (2.000 g) and toluene (25 mL). 3.5 mL of 30 weight % MAO was added dropwise to this stirring suspension, and stirring at ambient temperature was continued for 2 hours, followed by addition of a mixture of (FI)TiCl$_3$ (8.2 mg, 14 µmol) and (Cp*SiNR)TiCl$_2$ (15 mg, 41 µmol) in toluene (10 mL). After inserting a 180° connector equipped with a Teflon valve the flask was taken out of the glovebox and attached to a vacuum line. The suspension was stirred at 30° C. for 1 hour, then toluene was removed under vacuum to obtain a dry yellow powder (yield: 2.971 g).

Representative Procedure for Tandem Trimerization and Copolymerization of Ethylene at 1 Atmosphere.

In a dinitrogen-filled glovebox, a 250 mL round bottom flask was charged with a Teflon stir bar, s-(FI)Ti(1)-(Cp*SiNR)Ti(3) (0.302 g) and 50 mL of toluene. After inserting a 180° connector equipped with a Teflon valve the flask was moved from the glovebox to a vacuum line, and the slurry was cooled and degassed under high vacuum. Ethylene was supplied at 1 atm, and the reaction mixture was stirred for 3 hours at 25° C., after which the reaction was quenched with 2 mL of 12 M HCl and 10 mL of methanol. Acetone (20 mL) was added to aid polymer precipitation; the solid was filtered off and washed with methanol. The isolated polymer (yield: 11.7 g) was dried under vacuum for 3 hours. Polymer samples for NMR analysis were prepared by the addition of ~20 mg of material to 1 mL of 1,1,2,2,-tetrachloroethane-d2. $^{13}$C{$^1$H} NMR spectra were obtained with a Varian 500 MHz spectrometer at 130° C. with a relaxation delay of 2 seconds.

Representative Procedure for Tandem Trimerization and Copolymerization of Ethylene at Pressures >1 Atmosphere.

In a dinitrogen-filled glovebox, a miniclave Steel™ glass reactor was with a Teflon stir bar, s-(FI)Ti(3)-(Cp*SiNR)Ti (1) (0.302 g) and 50 mL of toluene. The sealed reactor was removed from the glove box and ethylene was supplied at 4.4 bar. The reaction was stirred for 3 hours at 25° C., after which the reaction was quenched with 2 mL of 12 M HCl and 10 mL of methanol. Acetone (20 mL) was added to aid polymer precipitation; the solid was filtered off and washed with methanol. The isolated polymer (yield: 8.95 g) was dried under vacuum for 3 hours.

Tandem Trimerization and Copolymerization of Ethylene with Added 1-Hexene.

The procedure is similar to the above except for the addition of 1-hexene with a micro syringe after the addition of toluene. After inserting the 180° connector the reactor assembly was immediately removed from the glovebox and frozen (to reduce poly-1-hexene formation), prior to attaching it to the high vacuum line for degassing and the addition of ethylene.

Gel Permeation Chromatography.
Chromatographic Conditions
HT-GPC
Solvent: TCB (1,2,4-Trichlorobenzene)
Flow rate: 1.0 ml/min
Injection volume: 200 µl
Column/Detector temperature: 140 C.°
Columns: 3× ViscoGEL HR-(S) HT 7.8 cm
GPC System HT-GPC 350A Sample Preparation for high temperature GPC. About 5.5 mg of the material was placed into a 40 ml glass vial and accurately weighed. 10 ml of the solvent was added using a clean 10 ml glass pipette. The vial was capped with a Teflon coated cap and the samples were placed into the Vortex Auto Sampler and left to dissolve for 3 hrs at 140° C. while stirring gently. Broad polystyrene samples were also used as controls.

Data Analysis. The polymer samples were successfully analysed by the Triple Detection method. The detector alignment and instrument sensitivity parameters were previously determined using a narrow polystyrene standard. A broad polystyrene standard was used for system verification.

Differential Scanning Calorimetry.
About 6.5 mg of the samples were taken for the analysis, with heating & cooling at a rate of 10° C./min under a nitrogen atmosphere. Each sample was analyzed twice for accuracy, and the average value reported as shown in Table 7.

NMR Spectra.
$^{13}C$ {$^1H$} NMR spectrum (130° C., tetrachloroethane) of LLDPE sample (20% 1-hexene incorporation) prepared using co-supported catalyst system (FIG. 5).

Kinetic Model.
A simplified kinetic model was constructed to help assess the extent to which the co-supported catalysts function independently, as opposed to cooperating and/or interfering with one another. The model consists of three reaction steps: insertion of ethylene into a polymer chain growing at the polymerization catalyst ("pcat"); insertion of 1-hexene into the polymer chain; and trimerization of ethylene to 1-hexene at the trimerization catalyst ("tcat"). The amounts of ethylene and hexene incorporated into polymer chains ("peth" and "phex" respectively), and the amount of free hexene ("hex"), will be determined by the following differential equations, assuming polymer growth and trimerization are independent first- and second-order processes respectively:

$$\frac{d[peth]}{dt} = k_1 [\text{ethylene}][pcat]$$

$$\frac{d[phex]}{dt} = k_2 [1\text{-hexene}][pcat]$$

$$\frac{d[hex]}{dt} = k_t [\text{ethylene}]^2 [tcat] - k_2 [1\text{-hexene}][pcat]$$

This model incorporates a number of simplifying assumptions, several of which are known to be only approximately valid at best, but which hopefully are good enough to answer the basic questions posed. First, all amounts of substances (including solids) are treated as effective concentrations of soluble species; this neglects any effects of mass transfer to and from the support surface. Second, catalyst "concentrations" are taken to be constant over the life of the run; the trimerization catalyst in particular is known to exhibit both gradual initiation and deactivation during such periods. (Sattler, A.; Aluthge, D. C.; Winkler, J. R.; Labinger, J. A.; Bercaw, J. E., ACS Catal. 2015, 6, 19). Two others are discussed below.

Numerical integration of the differential equations was performed by Euler's method, using a simple home-made BASIC program, and parameters adjusted to achieve the best fit to experimental results. All reactions modeled used 300 mg catalyst, with a total of 18 µmoles Ti/g, in 0.05 L of toluene, corresponding to a total effective [Ti] of 108 µM, divided between [pcat] and [tcat] as appropriate to the particular experiment; at 1 atm [ethylene]=0.142 M.

Test 1: Polymerization catalyst only; ethylene only: To match the experimental polymer yield of 6.55 g after 3 h, $k_1=24$ $M^{-1}$ $s^{-1}$.

Test 2: polymerization catalyst only; ethylene+90 mM 1-hexene. The predicted polymer yield substantially exceeds the experimental value (1.61 g with 5.1 mol % 1-hexene incorporation, suggesting that 1-hexene competes with ethylene for coordination to the polymerization catalyst and thus inhibits ethylene polymerization. There are a number of possible ways to build such behavior into the model, but the simplest (though again, only approximately valid) is to modify the first two equations by multiplying by the terms [ethylene]/([ethylene]+[hexene]) and [hexene]/([ethylene]+[hexene]) respectively. With that adjustment, good agreement with both the total polymer weight and 1-hexene incorporation was achieved with a value of $k_2=4$ $M^{-1}$ $s^{-1}$. Thus, within the limits of these approximations, 1-hexene is incorporated into a chain around ⅙ as rapidly as ethylene.

Test 3: Co-supported s-FI(Ti)(1)-(Cp*SiNR)Ti(3), ethylene only: The experimental results (polymer yield 3.21 g; 7.6 mol % 1-hexene in polymer; 129 mM 1-hexene in solution) were reproduced very closely (see Table 2) with $k_t=50$ $M^{-2}$ $s^{-1}$ and the above values for $k_1$ and $k_2$. No correction was made for the competing formation of decenes by co-trimerization of 1-hexene with two ethylenes; under these conditions that would not be expected to be a major factor. (Sattler, A.; Aluthge, D. C.; Winkler, J. R.; Labinger, J. A.; Bercaw, J. E., ACS Catal. 2015, 6, 19).

Test 4: Co-supported s-FI(Ti)(1)-(Cp*SiNR)Ti(3); ethylene+50 mM $^{13}CH_2$=$CHC_4H_9$: Experimental results for 1 and 2 h runs are compared to model predictions, using the above values for all three rate constants, in Table 1; reasonably good agreement was achieved for polymer yield, incorporation of 1-hexene into polymer, [hexene] in solution, and amount of label in both polymer and free hexene.

For the case of cooperative behavior—that is, if some fraction of hexene produced by trimerization gets transferred directly to a growing polymer chain without leaving the support surface—the model was modified by adding a term to each of the last two equations as follows, in which x=probability of 1-hexene being incorporated into polymer without going into solution:

$$\frac{d[phex]}{dt} = k_2[1\text{-hexene}][pcat] + k_t[\text{ethylene}]^2[tcat] \times [pcat]$$

$$\frac{d[hex]}{dt} = k_t[\text{ethylene}]^2[tcat](1-x)[pcat] - k_2[1\text{-hexene}][pcat]$$

Parameters $k_2$ and $k_t$ were optimized for this revised model and a value of x=0.5 by fitting predictions to the results of tests 2 and 3 above; the best match was not as good as for the baseline case of x=0, but not so much worse as to allow any confident conclusion. However, when this model was applied to the labeling studies of test 4, there were strong discrepancies between prediction and experiment, particularly with regard to the relative labeling of free and polymerized 1-hexene, as discussed herein, providing good evidence against any significant cooperative behavior.

Polymer Properties

TABLE 6

LLDPE samples used for analysis.

| Entry[a] | Sample ID | (FI)Ti:(Cp*SiNR)Ti | Ti loading (μmol/g)[b] | Amount (mg)[c] | Yield (g)[d] | 1-hexene incorporation[e] |
|---|---|---|---|---|---|---|
| 1 | DA_01_67 | 1:2 | 18 | 620 | 10.1 | 20% |
| 2 | DA_01_71 | 1:2.6 | 18 | 598 | 6.66 | 16% |
| 3 | DA_01_77 | 1:3 | 18 | 590 | 11.1 | 7.0% |
| 4 | DA_01_61 | 1:4 | 18 | 597 | 3.81 | 1.8% |
| 5 | DA_01_47 | 1:5 | 18 | 599 | 4.97 | 1.2% |
| 6 | DA_01_123 | 1:3 | 18 | 304 | 8.65 | 20% |

[a]Reactions in entries 1-5 were carried out as a slurry with 100 mL of toluene under 1 atmosphere ethylene pressure. Entry 6 was carried out at 3.4 atmosphere ethylene pressure with 50 mL of toluene.
[b]The total titanium content in the co-supported catalyst. [c]The amount of the co-supported silica catalyst used in the experiment. [d]Total dry weight of isolated polymer.[e]1-Hexene incorporation as determined using quantitative $^{13}C\{H\}$ NMR spectroscopy.

GPC Analysis

TABLE 7

Number averaged molecular weights ($M_n$) and polydispersity (PDI) for LLDPE.

| Sample | $M_n$ (×10$^5$ Da) | PDI | $T_m$ (° C.) |
|---|---|---|---|
| DA_01_47 | 4.14 | 2.38 | 119 |
| DA_01_61 | 3.67 | 3.20 | 117 |
| DA_01_67 | 3.69 | 1.88 | 114 |
| DA_01_71 | 2.57 | 2.77 | 116 |
| DA_01_77 | 4.03 | 2.27 | 115 |
| DA_01_123 | 4.11 | 2.12 | 115 |

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

The invention claimed is:

1. A supported catalyst system, comprising:
   a. a trimerization catalyst, wherein the trimerization catalyst is a cationic metal coordination complex of Formula Ia:

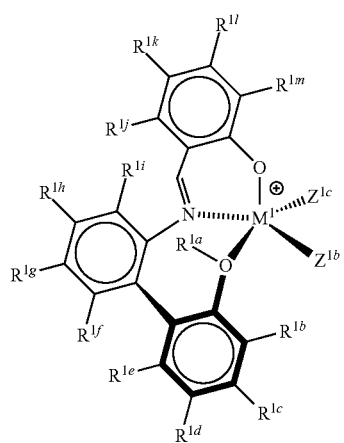

(Formula Ia)

wherein, $M^1$ is Ti, Zr, or Hf;

$Z^{1b}$ and $Z^{1c}$ are independently hydrogen or an optionally substituted substituent;

$R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl;

$R^{1b}$, $R^{1c}$, $R^{1d}$, and $R^{1e}$ are independently hydrogen or an optionally substituted substituent;

$R^{1f}$, $R^{1g}$, $R^{1h}$, and $R^{1i}$ are independently hydrogen or an optionally substituted substituent; and $R^{1j}$, $R^{1k}$, $R^{1l}$, and $R^{1m}$ are independently hydrogen or an optionally substituted substituent;

b. a polymerization catalyst, wherein the polymerization catalyst is a cationic metal coordination complex of Formula IIa:

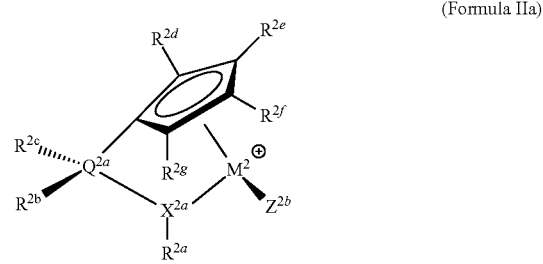

(Formula IIa)

wherein, $M^2$ is Ti, Zr, or Hf;

$Z^{2b}$ is hydrogen or an optionally substituted substituent;

$X^{2a}$ is O or N;

$Q^{2a}$ is C or Si;

$R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N;

$R^{2b}$ and $R^{2c}$ are independently hydrogen or an optionally substituted substituent; and $R^{2d}$, $R^{2e}$, $R^{2f}$, and $R^{2g}$ are independently hydrogen or an optionally substituted substituent; and c. an activated solid support, wherein the trimerization catalyst and the polymerization catalyst are attached to the activated solid support.

2. The supported catalyst system of claim 1, wherein $M^1$ is Ti;

$M^2$ is Ti;

$Z^{1b}$ and $Z^{1c}$ are independently selected from alkyl and substituted alkyl;

$Z^{2b}$ is selected from alkyl and substituted alkyl; and $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl.

3. The supported catalyst system of claim 1, wherein the cationic metal coordination complex of Formula Ia is:

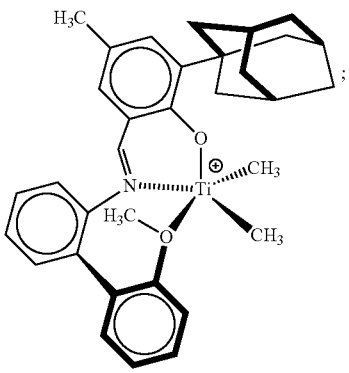

and
the cationic metal coordination complex of Formula IIa is:

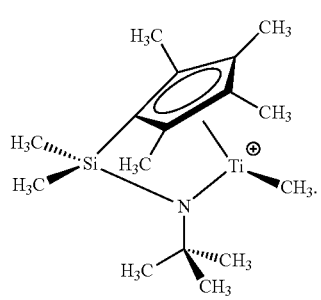

4. The supported catalyst system of claim 1, wherein the activated solid support comprises an activator and a solid support, wherein the activator is attached to the solid support.

5. The supported catalyst system of claim 4, wherein the activator is an aluminum compound.

6. The supported catalyst system of claim 4, wherein the solid support comprises an inorganic material, an organic material, or a combination thereof.

7. The supported catalyst system of claim 1, wherein the trimerization catalyst and the polymerization catalyst are attached to the same activated solid support.

8. A method to prepare a supported catalyst system of claim 1, comprising:
   a. obtaining a solid support;
   b. contacting the solid support with an activator to obtain an activated solid support; and
   c. contacting the activated solid support with a precatalyst mixture, wherein the precatalyst mixture comprises a trimerization precatalyst, a polymerization precatalyst, and an optional solvent, wherein the trimerization precatalyst is a metal coordination complex of Formula I:

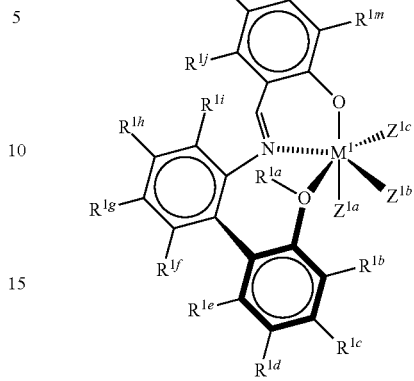

wherein,
$M^1$ is Ti, Zr, or Hf;
$Z^{1a}$, $Z^{1b}$, and $Z^{1c}$ are independently hydrogen or an optionally substituted substituent;
$R^{1a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl;
$R^{1b}$, $R^{1c}$, $R^{1d}$, and $R^{1e}$ are independently hydrogen or an optionally substituted substituent;
$R^{1f}$, $R^{1g}$, $R^{1h}$, and $R^{1i}$ are independently hydrogen or an optionally substituted substituent; and
$R^{1j}$, $R^{1k}$, $R^{1l}$, and $R^{1m}$ are independently hydrogen or an optionally substituted substituent; and the polymerization precatalyst is a metal coordination complex of Formula II:

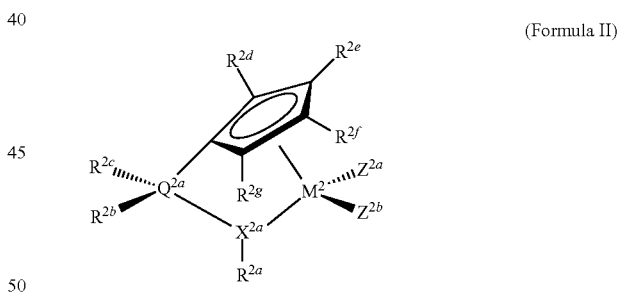

wherein,
$M^2$ is Ti, Zr, or Hf;
$Z^{2a}$ and $Z^{2b}$ are independently hydrogen or an optionally substituted substituent;
$X^{2a}$ is O or N;
$Q^{2a}$ is C or Si;
$R^{2a}$ is absent when $X^{2a}$ is O, or $R^{2a}$ is selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl when $X^{2a}$ is N;
$R^{2b}$ and $R^{2c}$ are independently hydrogen or an optionally substituted substituent; and
$R^{2d}$, $R^{2e}$, $R^{2f}$, and $R^{2g}$ are optionally substituted substituent.

9. The method of claim 8, wherein $M^1$ is Ti; and $M^2$ is Ti.

10. The method of claim 8, wherein the metal coordination complex of Formula I is:

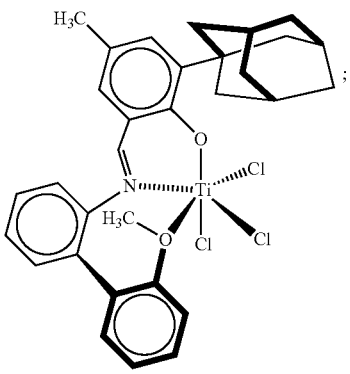

and
the metal coordination complex of Formula II is:

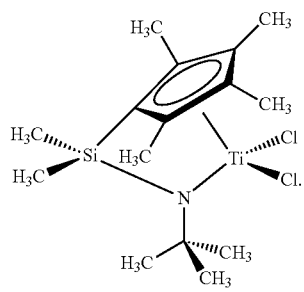

11. The method of claim 8, wherein the activator comprises an aluminum compound.

12. The method of claim 8, wherein the solid support comprises an inorganic material, an organic material, or a combination thereof.

13. A method for the preparation of a linear low density polyethylene (LLDPE) polymer, comprising:
  a. providing a supported catalyst system of claim 1;
  b. contacting the supported catalyst system of claim 1 with ethylene under conditions effective to promote the tandem trimerization and polymerization of ethylene to form the linear low density polyethylene polymer.

14. The method of claim 13, wherein
  $M^1$ is Ti;
  $M^2$ is Ti;
  $Z^{1b}$ and $Z^{1c}$ are independently selected from alkyl and substituted alkyl;
  $Z^{2b}$ is selected from alkyl and substituted alkyl; and
  $R^{2b}$ and $R^{2c}$ are independently selected from hydrogen, alkyl, substituted alkyl, aryl, substituted aryl, heteroalkyl, substituted heteroalkyl, heteroaryl, substituted heteroaryl, cyclyl, substituted cyclyl, heterocyclyl, and substituted heterocyclyl.

15. The method of claim 13, wherein the cationic metal coordination complex of Formula Ia is:

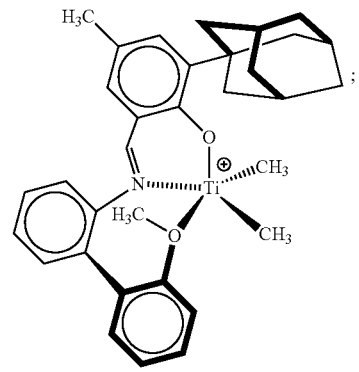

and
the cationic metal coordination complex of Formula IIa is:

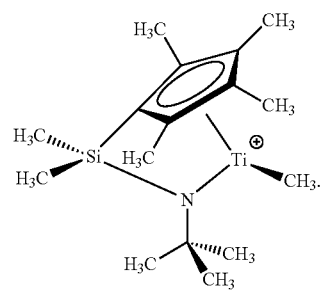

16. The method of claim 13, wherein the activated solid support comprises an activator and a solid support, wherein the activator is attached to the solid support.

17. The method of claim 16, wherein the activator is an aluminum compound.

18. The method of claim 16, wherein the solid support comprises an inorganic material, an organic material, or a combination thereof.

19. The method of claim 13, wherein the linear low density polyethylene polymer is a copolymer of ethylene and 1-hexene.

20. The method of claim 13, wherein the trimerization catalyst and the polymerization catalyst are attached to the same activated solid support.

* * * * *